(12) United States Patent
Kato

(10) Patent No.: US 9,549,418 B2
(45) Date of Patent: *Jan. 17, 2017

(54) WIRELESS COMMUNICATION SYSTEM, MOBILE STATION APPARATUS, BASE STATION APPARATUS, RANDOM ACCESS METHOD AND INTEGRATED CIRCUIT

(71) Applicant: SHARP KABUSHIKI KAISHA, Osaka-shi (JP)

(72) Inventor: Yasuyuki Kato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 34 days.

This patent is subject to a terminal disclaimer.

(21) Appl. No.: 14/614,624

(22) Filed: Feb. 5, 2015

(65) Prior Publication Data

US 2015/0156800 A1 Jun. 4, 2015

Related U.S. Application Data

(62) Division of application No. 13/638,480, filed as application No. PCT/JP2011/055483 on Mar. 9, 2011, now Pat. No. 8,995,371.

(30) Foreign Application Priority Data

Mar. 29, 2010 (JP) .................................. 2010-074815

(51) Int. Cl.
*H04W 74/08* (2009.01)
*H04W 72/04* (2009.01)
(Continued)

(52) U.S. Cl.
CPC .......... *H04W 74/0833* (2013.01); *H04L 5/001* (2013.01); *H04L 5/0007* (2013.01);
(Continued)

(58) Field of Classification Search
CPC .......... H04L 5/003; H04L 5/004; H04L 5/005; H04L 5/006; H04L 5/007; H04L 5/008; H04L 5/009; H04W 28/00; H04W 74/00
See application file for complete search history.

(56) References Cited

U.S. PATENT DOCUMENTS

| 6,937,641 B2 | 8/2005 | Li et al. |
| 7,873,005 B2 | 1/2011 | Ahn et al. |

(Continued)

FOREIGN PATENT DOCUMENTS

| CN | 101466153 A | 6/2009 |
| CN | 101478824 A | 7/2009 |

(Continued)

OTHER PUBLICATIONS

Fujitsu, RACH for connected mode in carrier aggregation, 3GPP TSG-RAN WG2 Meeting #69, R2-101541, 3GPP, Feb. 22-26, 2010.

(Continued)

*Primary Examiner* — Timothy J Weidner
(74) *Attorney, Agent, or Firm* — Greer Burns & Crain Ltd.

(57) ABSTRACT

The present invention enables random access which does not cause a load on a mobile station apparatus in an Advanced-EUTRA system. A wireless communication system in which a base station apparatus allocates a plurality of component carriers to a mobile station apparatus, and the base station apparatus and the mobile station apparatus perform communication via the component carriers, wherein the base station apparatus notifies the mobile station apparatus of allocation information of component carriers, setting information of a component carrier including information on random access, and setting information of a component carrier not including the information on random access; and the mobile station apparatus receives the allocation information and the setting information, and executes a random
(Continued)

access procedure only in the component carrier in which the information on random access is included in the setting information of the component carrier, among the plurality of component carriers allocated from the base station apparatus.

12 Claims, 11 Drawing Sheets

(51) Int. Cl.
*H04L 5/26* (2006.01)
*H04L 5/00* (2006.01)
*H04W 74/00* (2009.01)

(52) U.S. Cl.
CPC .......... *H04L 5/0053* (2013.01); *H04L 5/0091* (2013.01); *H04W 72/042* (2013.01); *H04W 74/006* (2013.01); *H04L 5/0044* (2013.01)

(56) References Cited

U.S. PATENT DOCUMENTS

| | | |
|---|---|---|
| 7,899,026 B2 | 3/2011 | Chun et al. |
| 8,559,405 B2 | 10/2013 | Dinan |
| 2001/0019542 A1 | 9/2001 | Diachina et al. |
| 2003/0095528 A1 | 5/2003 | Halton et al. |
| 2007/0147310 A1 | 6/2007 | Cai |
| 2008/0259900 A1 | 10/2008 | Masuda |
| 2008/0310395 A1 | 12/2008 | Kashima |
| 2009/0011769 A1 | 1/2009 | Park et al. |
| 2010/0074130 A1 | 3/2010 | Bertrand et al. |
| 2010/0098050 A1 | 4/2010 | Yamada et al. |
| 2010/0118788 A1 | 5/2010 | Ohta et al. |
| 2010/0135274 A1 | 6/2010 | Hong et al. |
| 2010/0182992 A1 | 7/2010 | Chun et al. |
| 2010/0278137 A1 | 11/2010 | Kwon et al. |
| 2011/0237265 A1 | 9/2011 | Sugawara et al. |
| 2011/0249657 A1 | 10/2011 | Kishiyama et al. |
| 2011/0287776 A1 | 11/2011 | Vujcic |
| 2012/0294185 A1 | 11/2012 | Queseth et al. |
| 2014/0010214 A1 | 1/2014 | Hooli et al. |

FOREIGN PATENT DOCUMENTS

| | | |
|---|---|---|
| CN | 101505538 A | 8/2009 |
| CN | 101540978 A | 9/2009 |
| WO | WO 2008/156305 A1 | 12/2008 |
| WO | WO 2010/032812 A1 | 3/2010 |

OTHER PUBLICATIONS

LG Electronics Inc., Multiple uplink carriers serving RACH, 3GPP TSG-RAN2 Meeting #68bis, R2-100335, 3GPP, Jan. 18-22, 2010.
Catt, Consideration on RACH in CA, 3GPP TSG RAN WG2 Meeting #69, R2-101058, 3GPP, Feb. 22-26, 2010.
Int'l. Search Report issued in PCT App. No. PCT/JP2011/055483, issued May 24, 2011.
Office Action issued in U.S. Appl. No. 13/638,480, issued on May 8, 2013.
Office Action issued in U.S. Appl. No. 13/638,480, issued on Nov. 21, 2013.
3GPP TS 36,300 V8.8.0 (Mar. 2009); Technical specification $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8).
3GPP TS 36.321 V8.5.0 (Mar. 2009); $3^{rd}$ General Partnership Project; Technical specification Group Radio Access Network; Evolved Universal Terrestrial Radio Access (E-UTRA) Medium Access Control (MAC) protocol specification (Release 8).
3GPP TR 36.814 V0.4.1 (Feb. 2009); Technical Report, $3^{rd}$ Generation Partnership Project; Technical Specification Group Radio Access Network; Further Advancements for E-UTRA, Physical Layer Aspects (Release 9).

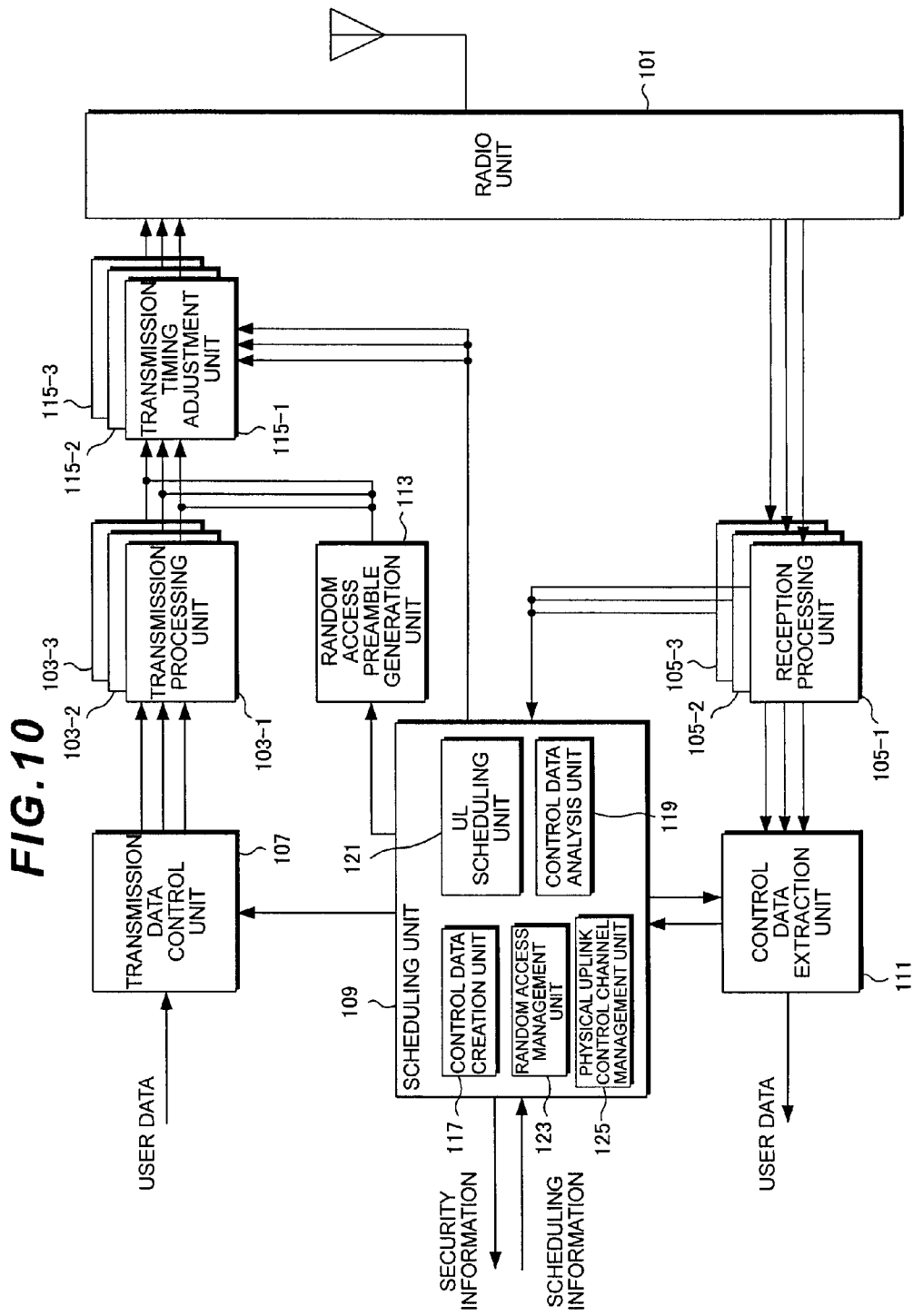

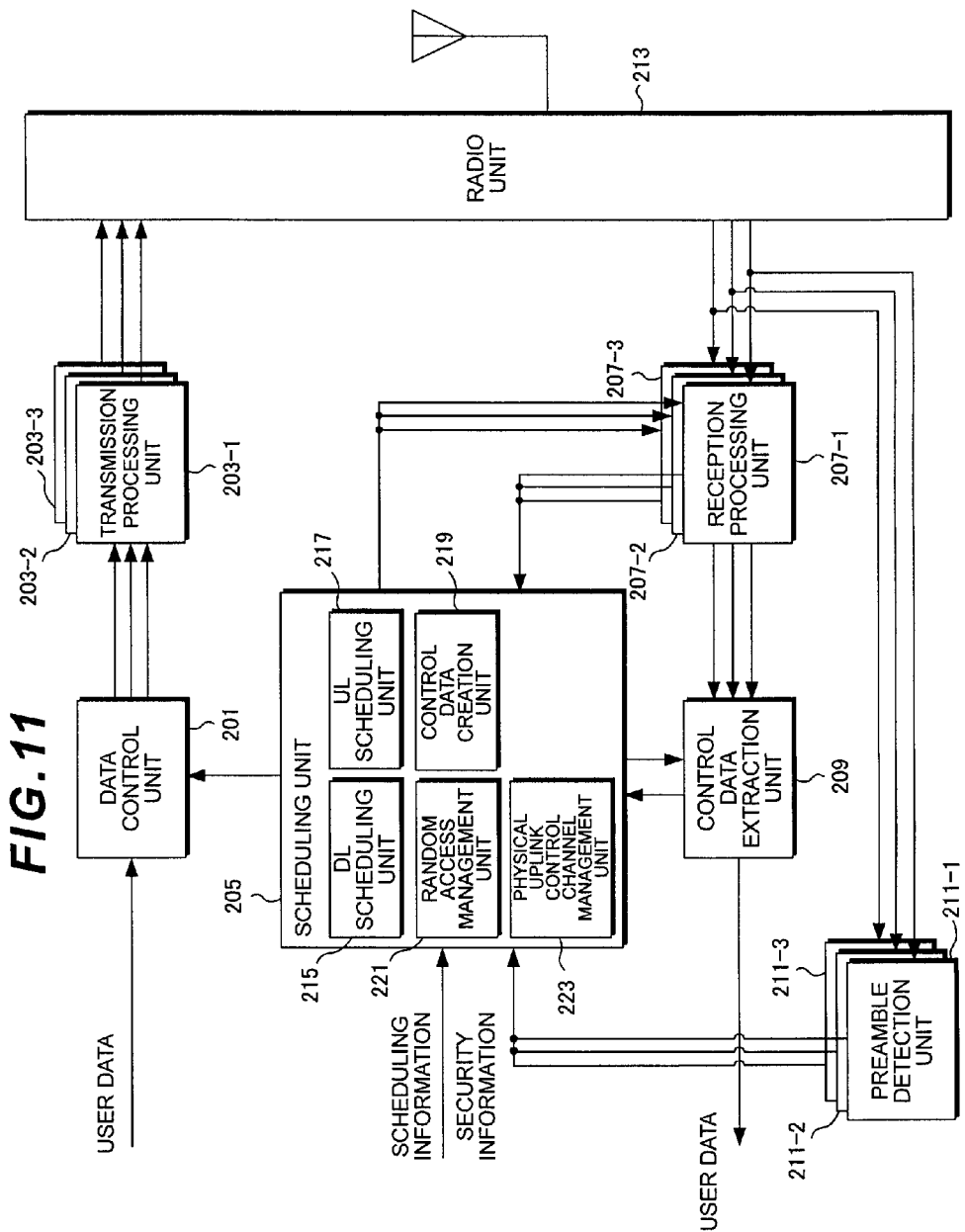

WIRELESS COMMUNICATION SYSTEM, MOBILE STATION APPARATUS, BASE STATION APPARATUS, RANDOM ACCESS METHOD AND INTEGRATED CIRCUIT

This application is a Divisional of application Ser. No. 13/638,480, filed Nov. 16, 2012, which is a U.S. National Phase under 35 U.S.C. §371 of International Application No. PCT/JP2011/055483, filed Mar. 9, 2011.

TECHNICAL FIELD

The present invention relates to a base station apparatus, a mobile station apparatus, and a wireless communication system, and more particularly, to a wireless communication system, a mobile station apparatus, a base station apparatus, a random access method, and an integrated circuit, in operations at the time of random access.

BACKGROUND ART

In 3GPP (3rd Generation Partnership Project), a W-CDMA scheme has been standardized as a third-generation cellular mobile communication scheme, and service thereof has been started sequentially. In addition, HSDPA with higher communication speed is also standardized, and service thereof is started.

In contrast, in 3GPP, standardization of Evolved Universal Terrestrial Radio Access (hereinafter referred to as "EUTRA") is promoted. As a downlink communication scheme of EUTRA, an OFDM (Orthogonal Frequency Division Multiplexing) scheme which is resistant to multipath interference and suitable for high-speed transmission is employed. In addition, as an uplink communication scheme, there is employed DFT (Discrete Fourier Transform)-spread OFDM scheme of SC-FDMA (Single Carrier-Frequency Division Multiple Access) which can reduce a PAPR (Peak to Average Power Ratio) of a transmission signal in consideration of cost and power consumption of a mobile station apparatus.

Furthermore, discussion on Advanced-EUTRA, which is further evolution of EUTRA, has also started in 3GPP. In Advanced-EUTRA, it has been assumed that through the use of a band to a maximum of 100-MHz bandwidth in an uplink and a downlink, respectively, communication at a transmission rate up to 1 Gbps in the downlink and 500 Mbps of the uplink is performed.

In Advanced-EUTRA, it has been considered that a 100 MHz band is achieved by binding a plurality of 20 MHz bands of EUTRA so as to be able to accommodate a mobile station apparatus of EUTRA. It should be noted that one band of not more than 20 MHz band of EUTRA has been referred to as a CC (Component Carrier) in Advanced-EUTRA (Non-patent Document 3).

CITATION LIST

Non-Patent Document 1:
  Non-Patent Document 1: 3GPP TS (Technical Specification) 36.300, V8.8.0 (2009-03), Evolved Universal Terrestrial Radio Access (E-UTRA) and Evolved Universal Terrestrial Radio Access Network (E-UTRAN), Overall description Stage2
  Non-Patent Document 2: 3GPP TS (Technical Specification) 36.321, V8.5.0 (2009-03), Evolved Universal Terrestrial Radio Access (E-UTRA) Medium Access Control (MAC) protocol specification
  Non-Patent Document 3: 3GPP TR (Technical Report) 36.814, V1.0.0 (2009-02), Evolved Universal Terrestrial Radio Access (E-UTRA) Radio Resource Control (RRC) Protocol specification

DISCLOSURE OF THE INVENTION

Problems to be Solved by the Invention

When a mobile station apparatus performs communication with a base station apparatus using a plurality of CCs, a transmission timing to a base station apparatus may differ for each uplink CC depending on a communication condition and a connection state to the base station apparatus, and thus it is required to adjust the transmission timing for each uplink CC.

However, in a case where it is required to adjust the transmission timing for each CC, random access processing is needed for each CC when uplink at the time of initial access and handover, etc. is out of synchronization. Ina case where a plurality of CCs is allocated to one mobile station apparatus, not only processing of the mobile station apparatus becomes complicated, but one mobile station apparatus performs plural random access when random access processing is simultaneously performed for each CC, thereby increasing a probability of contention at the time of random access.

The present invention has been made in view of such situations, and an object of the present invention is to provide a wireless communication system, a mobile station apparatus, a base station apparatus, a random access method, and an integrated circuit which enables an efficient random access with respect to an Advanced-EUTRA system.

Means for Solving the Problems (1) In order to achieve the above-described object, the present invention has taken the following measures. That is, a wireless communication system of the present invention is the wireless communication system in which a base station apparatus allocates a plurality of CCs to a mobile station apparatus, and the base station apparatus and the mobile station apparatus perform communication via the CCs, wherein the base station apparatus notifies the mobile station apparatus of allocation information of CCs, setting information of a CC including information on random access, and setting information of a CC not including the information on random access, and that the mobile station apparatus receives the allocation information and the setting information, and executes a random access procedure only in the CC in which the information on random access is included in the setting information of the CC, among the plurality of CCs allocated from the base station apparatus.

(2) In addition, a wireless communication system of the present invention is the wireless communication system in which a base station apparatus allocates a plurality of CCs to a mobile station apparatus, and the base station apparatus and the mobile station apparatus perform communication via the CCs, wherein the base station apparatus notifies the mobile station apparatus of security information, and the mobile station apparatus executes a random access procedure in a CC to which a security function indicated from the security information has been set, when needing random access of a scheduling request, and executes a random access procedure in CCs other than the CC to which the security function has been allocated, only when a random access instruction is received through a physical downlink control channel.

(3) In addition, a mobile station apparatus of the present invention is the mobile station apparatus to which a plurality of CCs is allocated from a base station apparatus, and which performs communication with the base station apparatus via the CCs, wherein the mobile station apparatus receives, from the base station apparatus, allocation information of CCs, setting information of a CC including information on random access, and setting information of a CC not including the information on random access, and executes a random access procedure only in the CC in which the information on random access is included in the setting information of the CC, among the plurality of CCs allocated from the base station apparatus.

(4) In addition, a mobile station apparatus of the present invention is the mobile station apparatus to which a plurality of CCs is allocated from a base station apparatus, and which performs communication with the base station apparatus via the CCs, wherein when receiving security information from the base station apparatus, and needing random access of a scheduling request, the mobile station apparatus executes a random access procedure in a CC to which a security function indicated from the security information has been set, and executes the random access procedure in the CCs other than the CC to which the security function has been allocated, only when receiving a random access instruction through a physical downlink control channel.

(5) In addition, a mobile station apparatus of the present invention is the mobile station apparatus to which a plurality of CCs is allocated from a base station apparatus, and which performs communication with the base station apparatus via the CCs, wherein when receiving allocation information of a physical uplink control channel from the base station apparatus, and needing random access of a scheduling request, the mobile station apparatus executes a random access procedure in a CC to which the physical uplink control channel has been allocated, and executes the random access procedure in the CCs other than the CC to which the physical uplink control channel has been allocated, only when receiving a random access instruction through a physical downlink control channel.

(6) In addition, a mobile station apparatus of the present invention is the mobile station apparatus to which a plurality of CCs is allocated from a base station apparatus, and which performs communication with the base station apparatus via the CCs, wherein when receiving random access instruction information for other CCs through a physical downlink control channel during execution of a random access procedure in one CC, the mobile station apparatus performs either one of processing to ignore the random access instruction information, or to cancel the random access procedure being executed to start the random access procedure in a CC indicated by the random access instruction information.

(7) In addition, a base station apparatus of the present invention is the base station apparatus which allocates a plurality of CCs to a mobile station apparatus, and which performs communication with the mobile station apparatus via the CCs, wherein the base station apparatus notifies the mobile station apparatus of allocation information of CCs, setting information of a CC including information on random access, and setting information of a CC not including the information on random access.

(8) In addition, a random access method of the present invention is the random access method applied to a wireless communication system in which a base station apparatus allocates a plurality of CCs to a mobile station apparatus, and the base station apparatus and the mobile station apparatus perform communication via the CCs, wherein the random access method includes at least the steps of: in the base station apparatus, notifying the mobile station apparatus of allocation information of CCs, setting information of a CC including information on random access, and setting information of a CC not including the information on random access; in the mobile station apparatus, receiving the allocation information and the setting information; and executing a random access procedure only in the CC in which the information on random access is included in the setting information of the CC, among the plurality of CCs allocated from the base station apparatus.

(9) In addition, a random access method of the present invention is the random access method applied to a wireless communication system in which a base station apparatus allocates a plurality of CCs to a mobile station apparatus, and the base station apparatus and the mobile station apparatus perform communication via the CCs, and wherein the random access method includes at least the steps of: in the base station apparatus, notifying the mobile station apparatus of security information; in the mobile station apparatus, executing a random access procedure in a CC to which a security function indicated from the security information has been set, when random access of a scheduling request is needed; and executing the random access procedure in CCs other than the CC to which the security function has been allocated, only when the mobile station apparatus receives a random access instruction through a physical downlink control channel.

(10) In addition, an integrated circuit of the present invention is the integrated circuit which causes a mobile station apparatus to exert a plurality of functions by being implemented in the mobile station apparatus, wherein the integrated circuit causes a mobile station apparatus to exert a series of functions of: performing communication with a base station apparatus through a plurality of CCs allocated by the base station apparatus; obtaining security information from the base station apparatus; executing a random access procedure in a CC to which a security function has been set from the security information, when random access of a scheduling request is needed; and executing the random access procedure in CCs other than the CC to which the security function has been allocated, only when the mobile station apparatus receives a random access instruction through a physical downlink control channel.

(11) In addition, an integrated circuit of the present invention is the integrated circuit which causes a mobile station apparatus to exert a plurality of functions by being implemented in the mobile station apparatus, wherein the integrated circuit causes the mobile station apparatus to exert a series of functions of: performing communication with a base station apparatus through a plurality of CCs allocated by the base station apparatus; receiving, from the base station apparatus, allocation information of CCs, setting information of a CC including information on random access, and setting information of a CC not including the information on random access; and executing a random access procedure only in the CC in which the information on random access is included in the setting information of the CC, among the plurality of CCs allocated from the base station apparatus.

(12) In addition, an integrated circuit of the present invention is the integrated circuit which causes a base station apparatus to exert a plurality of functions by being implemented in the base station apparatus, wherein the integrated circuit causes the base station apparatus to exert a series of functions of; allocating a plurality of CCs to a mobile station apparatus, and performing communication with the mobile station apparatus via the CC; and notifying the mobile station apparatus of allocation information of CCs, setting information of a CC including information on random access, and setting information of a CC not including the information on random access.

Advantage of the Invention

According to the present invention, also in a case where a plurality of CCs is allocated to one mobile station apparatus in an Advanced-EUTRA system, unnecessary random access processing does not come to be generated. This enables an efficient random access.

BRIEF DESCRIPTION OF THE DRAWINGS

FIG. 10 is a diagram showing a configuration of a mobile station apparatus according to an embodiment 2 of the present invention; and FIG. 11 is a diagram showing a configuration of a base station apparatus according to the embodiment 2 of the present invention.

BEST MODES FOR CARRYING OUT THE INVENTION

A downlink of EUTRA is configured with: a downlink pilot channel DPiCH; a downlink synchronization channel DSCH; a physical downlink shared channel PDSCH; a physical downlink control channel PDCCH; and a common control physical channel CCPCH.

An uplink of EUTRA is configured with: an uplink pilot channel UPiCH; a random access channel RACH; a physical uplink shared channel PUSCH; and a physical uplink control channel PUCCH (Non-Patent Document 1).

Figure 1:
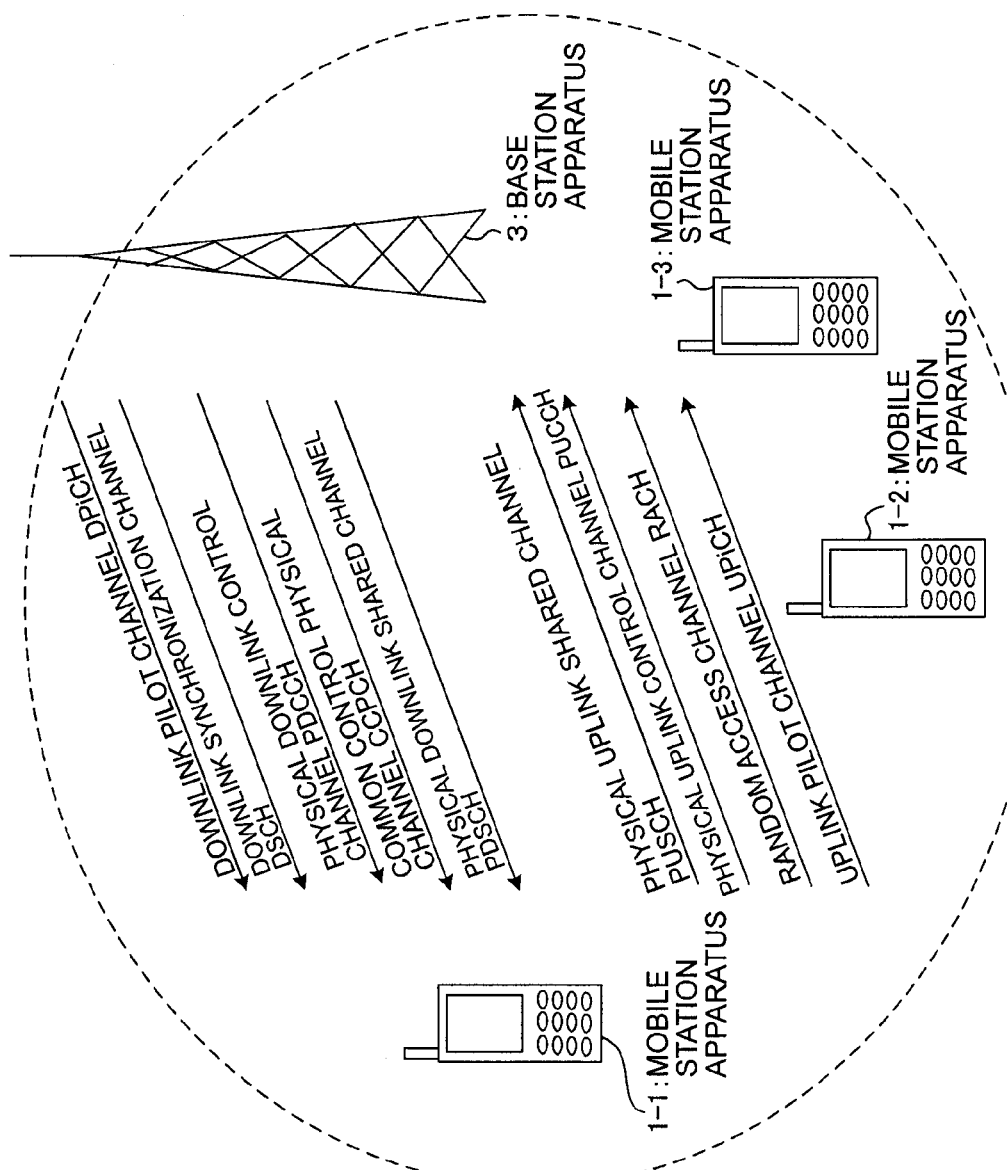
FIG. 1 is a drawing showing a channel configuration in EUTRA.
Figure 2:
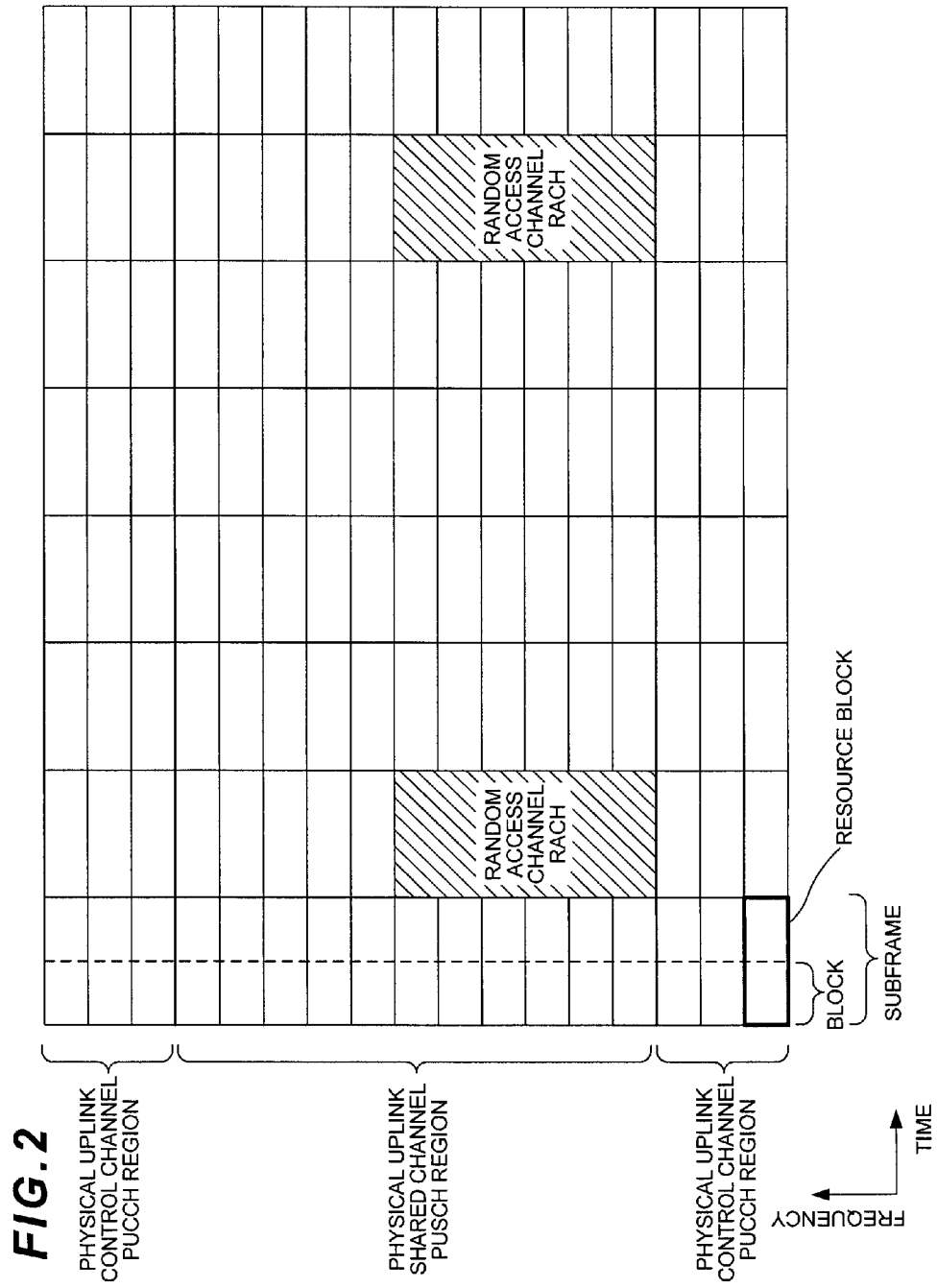
FIG. 2 is a chart showing an uplink configuration in EUTRA.

FIG. 1 is a drawing showing a channel configuration in EUTRA, and FIG. 2 is a chart showing an uplink configuration in EUTRA. One block is configured with twelve subcarriers and seven OFDM symbols. Additionally, by using two blocks, one resource block is configured. One random access channel RACH is prepared in one subframe, and corresponds to access from a number of mobile station apparatuses, for example, mobile station apparatuses 1-1 to 1-3 (hereinafter, the mobile station apparatuses 1-1 to 1-3 are also collectively referred to as a mobile station apparatus 1).

Notification of an arrangement configuration (a frequency position and a time position) of the random access channel RACH is provided as broadcast information from a base station apparatus 3 to the mobile station apparatuses 1-1 to 1-3. The random access channel RACH is arranged in a certain period, and the random access channel RACH, and a region of a physical uplink shared channel PUSCH and a region of a physical uplink control channel PUCCH are separated as shown in FIG. 2. It should be noted that one random access channel RACH is configured by using six resource blocks. An intended use of the physical random access channel is to establish synchronization between the mobile station apparatuses 1-1 to 1-3 and the base station apparatus 3 (to adjust a transmission timing from the mobile station apparatuses 1-1 to 1-3 to the base station apparatus 3) in an uplink.

A random access procedure includes two access procedures of Contention based Random Access and Non-contention based Random Access (Non-Patent Document 1).

Figure 3:
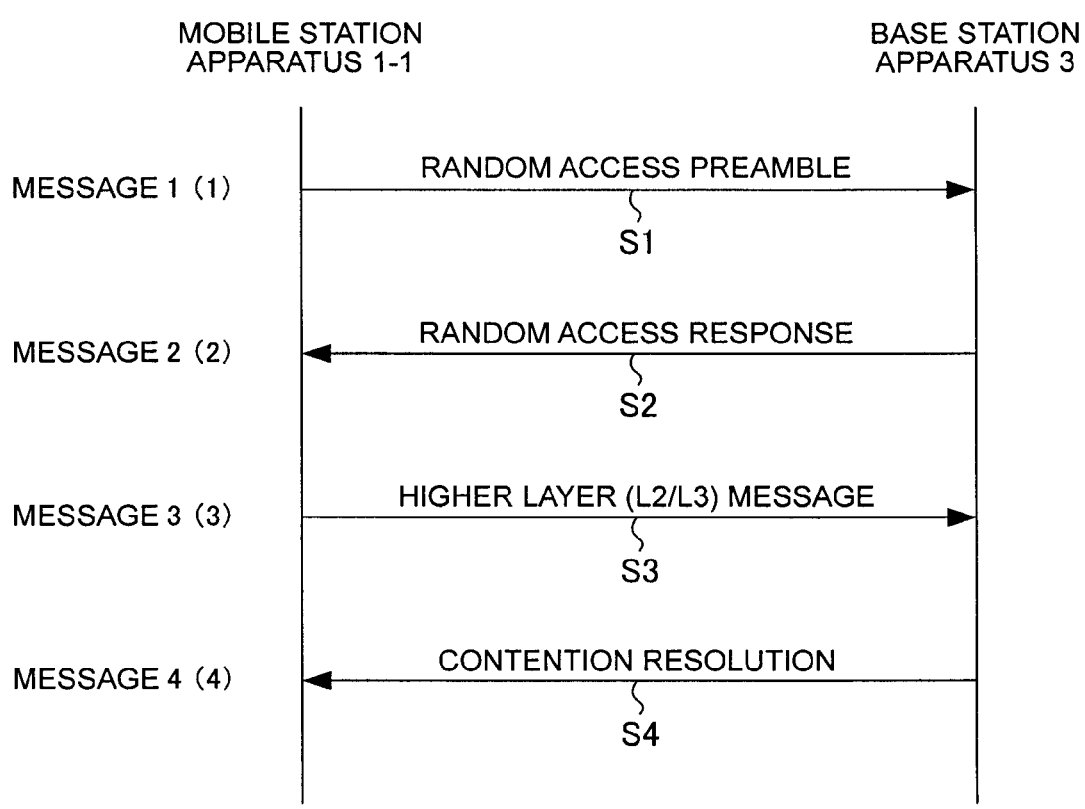
FIG. 3 is a diagram showing a procedure of Contention based Random Access.

FIG. 3 is a diagram showing a procedure of Contention based Random Access. The Contention based Random Access is the random access in which contention may occur between the mobile station apparatuses 1, and the Contention based Random Access is performed at the time of initial access from a state of not being connected to (communicated with) the base station apparatus 3, and when uplink data transmission occurs in the mobile station apparatus 1 in a state where an uplink is out of synchronization, although the mobile station apparatus 1 is being connected with the base station apparatus 3.

Figure 4:
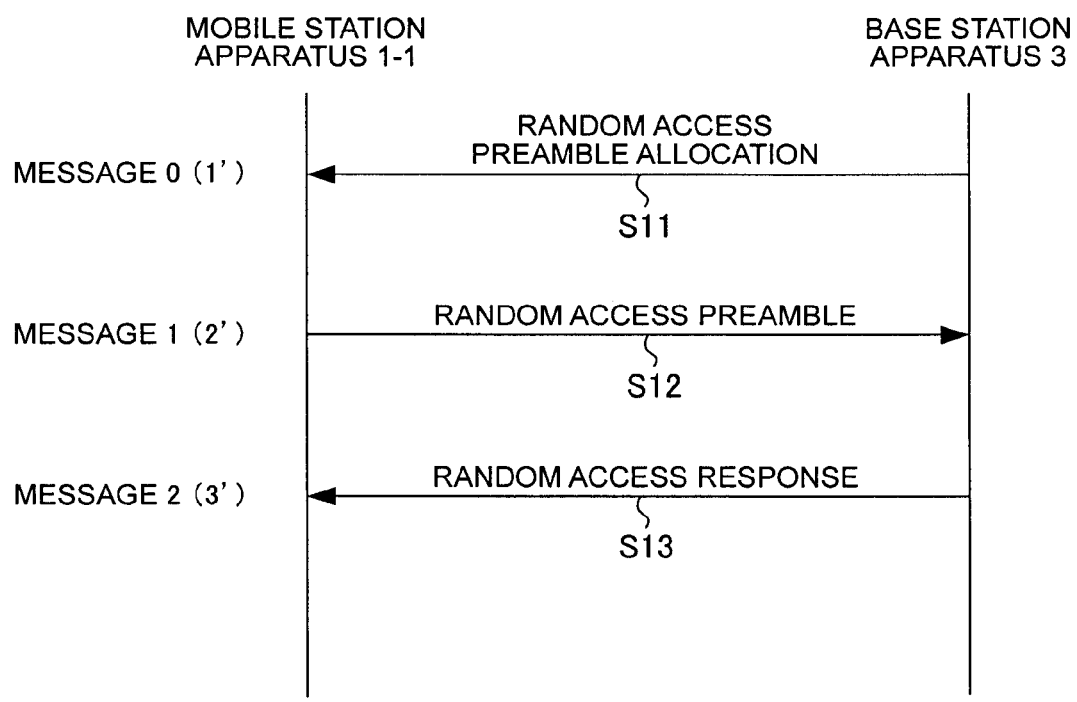
FIG. 4 is a diagram showing a procedure of Non-contention based Random Access.

FIG. 4 is a diagram showing a procedure of Non-contention based Random Access. The Non-contention based Random Access is the random access in which contention does not occur between the mobile station apparatuses 1, and in which the mobile station apparatus 1 starts random access by being instructed from the base station apparatus 3 in the case where the base station apparatus 3 and the mobile station apparatus 1 are being connected to each other and in a special case, such as a case where handover for immediately establishing synchronization between the mobile station apparatus 1 and the base station apparatus 3, and a transmission timing of the mobile station apparatus 1 is not valid (Non-Patent Document 1). The Non-contention based Random Access is instructed by an RRC (Radio Resource Control: Layer3) message and control data of a physical downlink control channel PDCCH.

When the mobile station apparatus 1-1 accesses the random access channel RACH, it transmits only a random access preamble. The random access preamble is configured with a preamble portion and a CP (Cyclic prefix) portion. A CAZAC (Constant Amplitude Zero Auto-Correlation Zone Code) sequence, which is a signal pattern indicating information, is used for the preamble portion, and sixty-four types of sequences are prepared and 6-bit information is represented.

Figure 5:
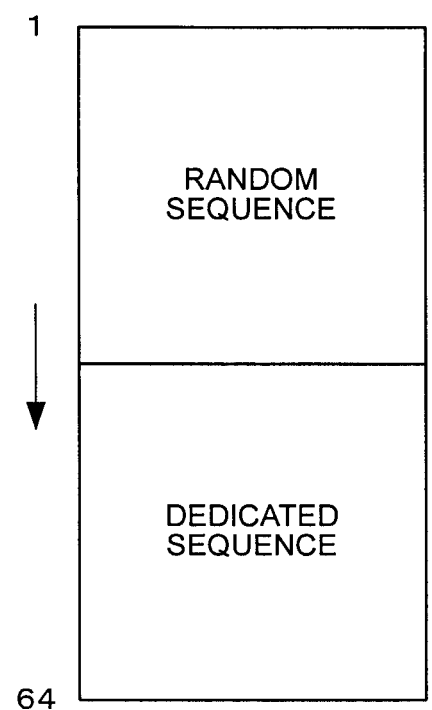
FIG. 5 is an illustration showing an example of a sequence group in EUTRA.

As shown in FIG. 5, the CAZAC sequence used for the random access preamble is roughly separated into a sequence used in Contention based Random Access (a random sequence or a random preamble) and a sequence used in Non-contention based Random Access (a dedicated sequence or a dedicated preamble). It should be noted that notification of the information on generation of the random access preamble is also provided from the base station apparatus 3 to the mobile station apparatuses 1-1 to 1-3 as broadcast information.

A procedure of Contention based Random Access will be briefly described by using FIG. 3. First, the mobile station apparatus 1-1 of the mobile station apparatuses 1 transmits a random access preamble to the base station apparatus 3 (message 1: (1), step S1). Subsequently, the base station apparatus 3 having received the random access preamble transmits a response (random access response) to the random access preamble to the mobile station apparatus 1-1 (message 2: (2), step S2). The mobile station apparatus 1-1 transmits a message of a higher layer (Layer2/Layer3) based on scheduling information included in the random access response (message 3: (3), step S3). The base station apparatus 3 transmits a contention confirmation message to the mobile station apparatus 1-1 which has received the higher layer message of (3) (message 4: (4), step S4). It should be noted that Contention based Random Access is also referred to as random preamble transmission.

A procedure of Non-contention based Random Access will be briefly described by using FIG. 4. First, the base station apparatus 3 notifies the mobile station apparatus 1-1 of a preamble number (or a sequence number) and a physical random access channel number to be used (message 0: (1)', step S11). The mobile station apparatus 1-1 transmits a random access preamble of a specified preamble number to a specified random access channel RACH (message 1: (2)', step S12). Subsequently, the base station apparatus 3 having received the random access preamble transmits a response (random access response) to the random access preamble to the mobile station apparatus 1-1 (message 2: (3)', step S13). However, when a value of the notified preamble number is 0, Contention based Random Access is performed. It should be noted that Non-contention based Random Access is also referred to as dedicated preamble transmission.

The procedure of Contention based Random. Access will be specifically described regarding FIG. 3. First, the mobile station apparatus 1-1 selects one random sequence from a random sequence group based on a downlink radio channel state (path loss) or a size of the message 3, generates a random access preamble based on the selected random sequence, and transmits the random access preamble through the random access channel RACH (message 1: (1)).

When detecting the random access preamble from the mobile station apparatus 1-1, the base station apparatus 3 calculates an amount of transmission timing lags between the mobile station apparatus 1-1 and the base station apparatus 3 from the random access preamble, performs scheduling (specification of an uplink radio resource position, a transmission format (message size), etc.) in order to transmit the L2/L3 message, allocates Temporary C-RNTI (Cell-Radio Network Temporary Identity: mobile station apparatus identification information), arranges in a physical downlink control channel PDCCH RA-RNTI indicating a response (random access response) addressed to the mobile station apparatus 1-1 having transmitted the random access preamble of the random access channel RACH, and transmits, to a physical downlink shared channel PDSCH, the random access response message including transmission timing information, scheduling information, Temporary CRNTI, and a preamble number (sequence number) of the received preamble (message 2: (2)).

When detecting that RA-RNTI exists in the physical downlink control channel PDCCH, the mobile station apparatus 1-1 confirms a content of the random access response message arranged in the physical downlink shared channel PDSCH, and when a preamble number corresponding to the transmitted random access preamble is included in the random access response message, the mobile station apparatus 1-1 extracts message information, adjusts the transmission timing, and transmits the L2/L3 message including information for identifying the mobile station apparatus 1-1, such as C-RNTI (or Temporary C-RNTI), or IMSI (International Mobile Subscriber Identity) by a scheduled radio resource and a transmission format (message 3: (3)). When the transmission timing has been adjusted, a timer in which the adjusted transmission timing is valid is started, and the transmission timing becomes invalid when the timer expires. While the transmission timing is valid, data transmission from the mobile station apparatus 1 can be performed, and when the transmission timing is invalid, only transmission of the random access preamble can be performed in the uplink transmission.

It should be noted that the mobile station apparatus 1-1 continues to wait for the random access response message from the base station apparatus 3 for a certain period, and transmits the random access preamble again when not receiving the random access response message including the preamble number of the transmitted random access preamble.

When receiving the L2/L3 message from the mobile station apparatus 1-1, the base station apparatus 3 transmits, to the mobile station apparatus 1-1, a contention confirmation (contention resolution) message for determining whether contention has occurred between the mobile station apparatuses 1-1 to 1-3 by using C-RNTI (or Temporary C-RNTI) or IMSI included in the received L2/L3 message (message 4: (4)).

Meanwhile, when not detecting the random access response message including the preamble number corresponding to the random access preamble transmitted within a certain period, when failing to transmit the message 3, or when not detecting identification information of the mobile station apparatus 1-1 itself in the contention confirmation message within a certain period, the mobile station apparatus 1-1 starts again from transmission of the random access preamble (message 1: (1)) (Non-Patent Document 2). It should be noted that exchange of control data for connection is further performed between the base station apparatus 3 and the mobile station apparatus 1-1 after the end of the random access procedure.

In addition, discussion on Advanced-EUTRA, which is further evolution of EUTRA, has also started in 3GPP. In Advanced-EUTRA, it is assumed that through the use of a band to a maximum of 100-MHz bandwidth in an uplink and a downlink, respectively, communication at a transmission rate up to 1 Gbps in the downlink and 500 Mbps of the uplink is performed.

Figure 6:
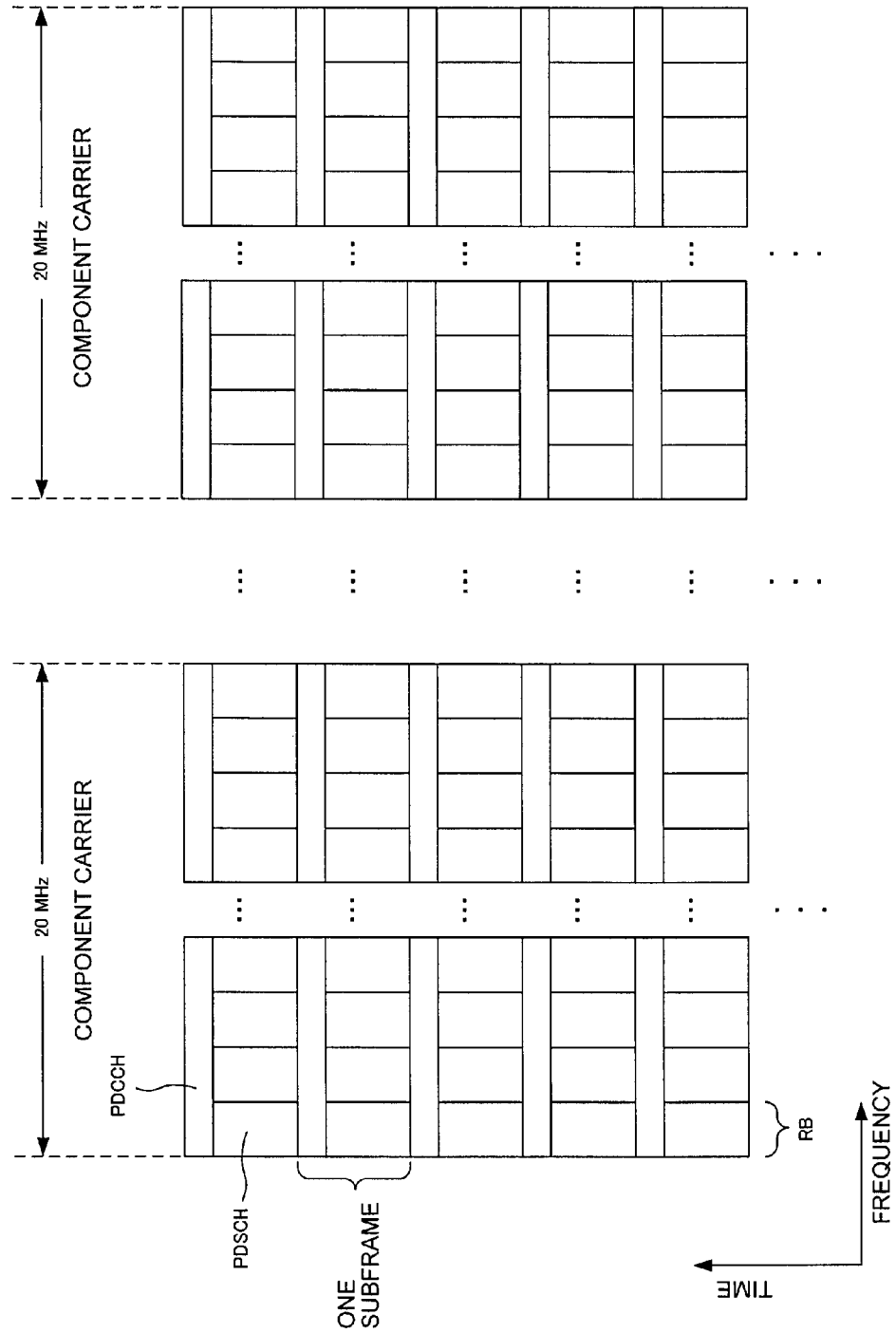
FIG. 6 is an explanatory chart regarding a downlink CC in Advanced-EUTRA.
Figure 7:
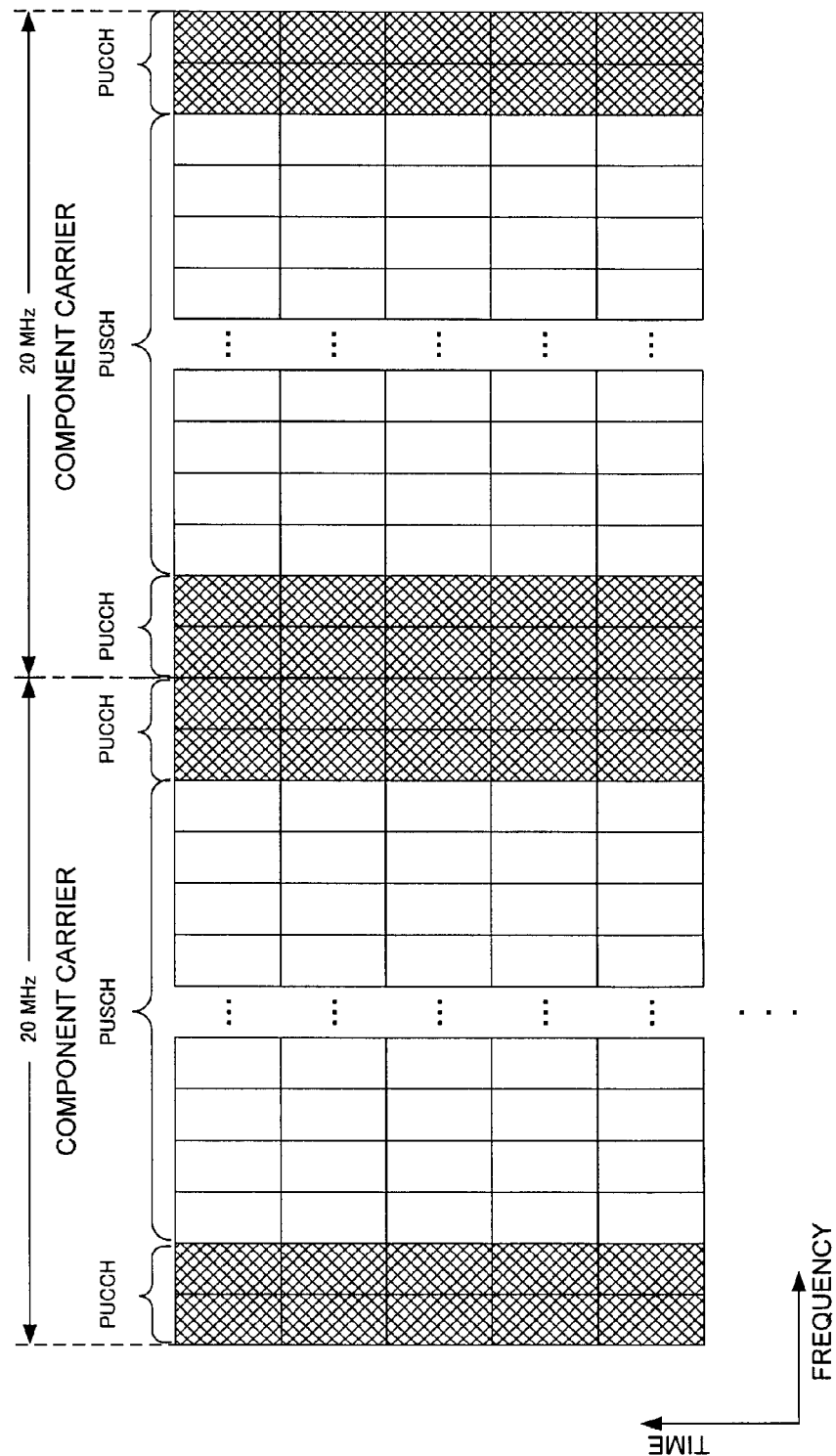
FIG. 7 is an explanatory chart regarding an uplink CC in Advanced-EUTRA.

FIG. 6 is an explanatory chart regarding a downlink CC in Advanced-EUTRA. FIG. 7 is an explanatory chart regarding an uplink CC in Advanced-EUTRA.

In Advanced-EUTRA, it is considered that a 100 MHz band is achieved by binding a plurality of 20 MHz bands of EUTRA so as to be able to include the mobile station apparatus 1 of EUTRA. It should be noted that in Advanced-EUTRA, one band of not more than 20 MHz band of EUTRA is referred to as a CC (Component Carrier) (Non-Patent Document 3).

The base station apparatus 3 allocates one or more CCs suitable for communication capability and a communication condition of the mobile station apparatus 1 among the plurality of CCs, and the mobile station apparatus 1 transmits and receives data in the allocated CC(s).

When the mobile station apparatus 1 performs communication with the base station apparatus 3 through the use of the plurality of CCs, a transmission timing to the base station apparatus 3 may differ for each uplink CC depending on a communication condition and a connection state to the base station apparatus 3, and it is required to adjust the transmission timing for each uplink CC.

EXAMPLE 1

Configuration Description

Figure 8:
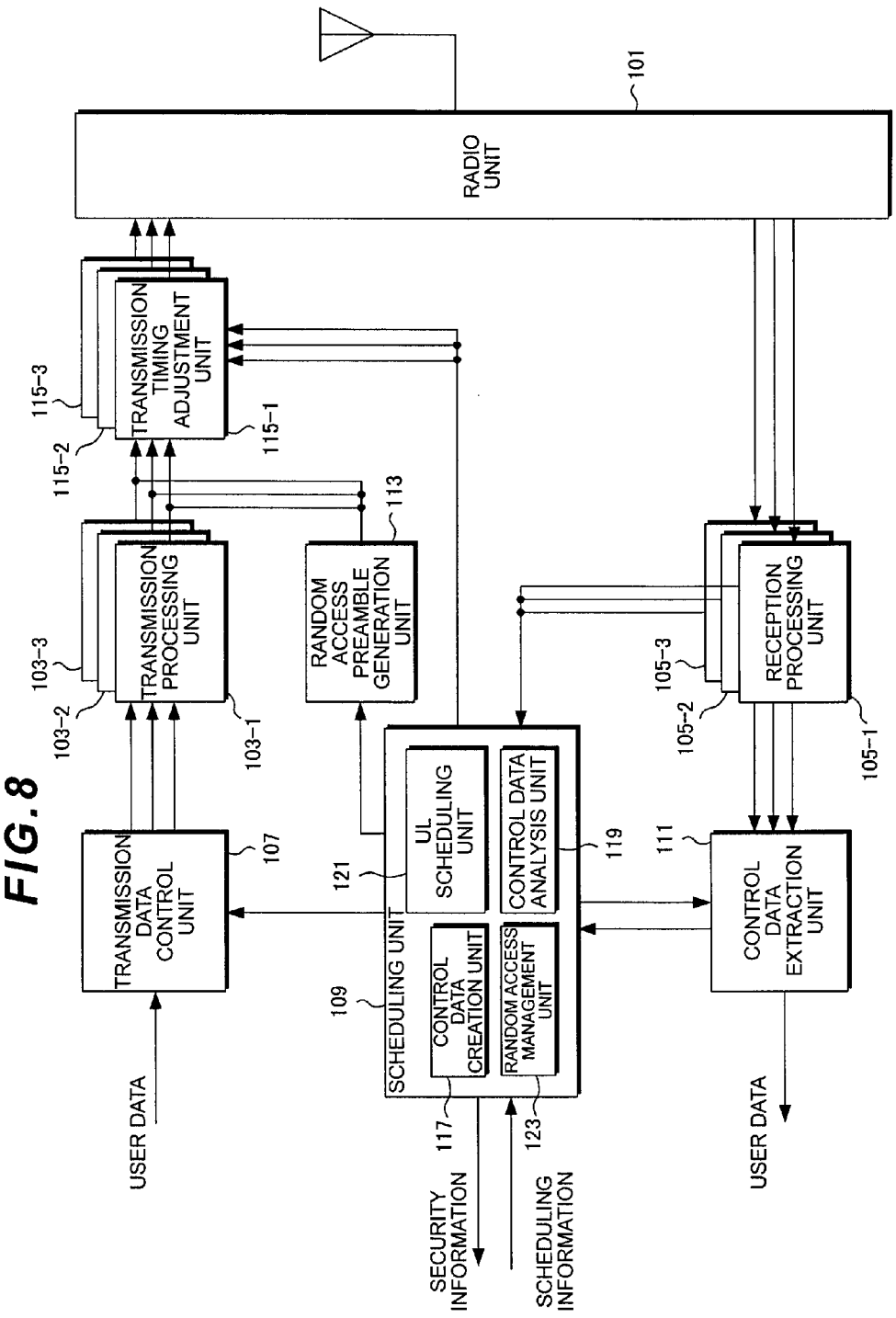
FIG. 8 is a diagram showing a configuration of a mobile station apparatus according to an embodiment 1 of the present invention.

FIG. 8 is a diagram showing a configuration of the mobile station apparatus 1 according to the embodiment of the present invention. The mobile station apparatuses 1-1 to 1-3 are respectively configured with: a radio unit 101; transmission processing units 103-1 to 103-3 (hereinafter, the transmission processing units 103-1 to 103-3 are also collectively represented as a transmission processing unit 103); reception processing units 105-1 to 105-3 (hereinafter, the reception processing units 105-1 to 105-3 are also collectively represented as a reception processing unit 105); a transmission data control unit 107; a scheduling unit 109; a control data extraction unit 111; a random access preamble generation unit 113; transmission timing adjustment units 115-1 to 115-3 (hereinafter, the transmission timing adjustment units 115-1 to 115-3 are also collectively represented as a transmission timing adjustment unit 115). The scheduling unit 109 is configured with: a control data creation unit 117; a control data analysis unit 119; a UL scheduling unit 121; and a random access management unit 123. It should be noted that since an example where there are three CCs is shown in the Example, a configuration having three transmission processing units 103, reception processing units 105, and transmission timing adjustment units 115 is employed.

User data and control data are input into the transmission data control unit 107, and the transmission data control unit 107 allocates each data to each channel of each CC by an instruction of the scheduling unit 109 to perform encryption of the data, and transmits it to the transmission processing units 103-1 to 103-3. In the transmission processing units 103-1 to 103-3, a signal from the transmission data control unit 107 is subjected to encoding and modulation. DFT-IFFT (Inverse Fast Fourier Transform) processing is performed on the modulated signal, and CP is inserted. In the transmission timing adjustment units 115-1 to 115-3, a transmission timing of data is adjusted from transmission timing information passed from the scheduling unit 109, and after the transmission timing is adjusted, the data is up-converted to a radio frequency by the radio unit 101, and transmitted from a transmission antenna. It should be noted that the random access preamble is transmitted without adjustment of the transmission timing even in a state where the transmission timing has been set.

The radio unit 101 down-converts a radio signal received from the antenna, and passes it to the reception processing units 105-1 to 105-3. The reception processing units 105-1 to 105-3 perform FFT (Fast Fourier Transform) processing, decoding, demodulation processing, etc. of the signal passed from the radio unit 101, and passes the demodulated data to the control data extraction unit 111. In addition, the reception processing units 105-1 to 105-3 measure downlink radio channel characteristics, and pass a measurement result to the scheduling unit 109. The control data extraction unit 111 breaks encryption of input data, sees C-RNTI (mobile station apparatus identification information) which is arranged in a physical downlink control channel PDCCH of each CC, and downlink scheduling information, and discriminates whether they are data addressed to the mobile station apparatus 1 itself, and when they are the data addressed to the mobile station apparatus 1 itself, the control data extraction unit 111 separates data of the physical downlink shared channel PDSCH demodulated by the reception processing units 105-1 to 105-3 into control data and user data. Then, the control data extraction unit 111 passes the control data to the scheduling unit 109, and passes the user data to a higher layer. In addition, the control data extraction unit 111 passes uplink scheduling information included in the physical downlink control channel PDCCH to the scheduling unit 109. In addition to that, when detecting RA-RNTI (Random Access-Radio Network Temporary Identity) after transmitting the random access preamble, the control data extraction unit 111 passes a random access response message to the scheduling unit 109. In addition to that, the control data extraction unit 111 instructs the scheduling unit 109 to return a response to the received data.

The scheduling unit 109 is configured with: the UL scheduling unit 121; the control data analysis unit 119; the control data creation unit 117; and the random access management unit 123, and the control data creation unit 117 creates control data, and creates a response of downlink data received by the control data extraction unit 111. The control data analysis unit 119 analyzes the control data from the control data extraction unit 111, passes scheduling information of uplink data to the UL scheduling unit 121, and passes, to the random access management unit 123 and the random access preamble generation unit 113, information on random access broadcasted from the base station apparatus 3 (arrangement information of the random access channel RACH, random access preamble generation information, etc.), information on random access, notification of which is provided at the time of initial access, random access instruction information, notification of which is provided from the base station apparatus 3, and a message content of a random access response. In addition, the control data analysis unit 119 passes information on security from the base station apparatus 3 to the transmission data control unit 107, the control data extraction unit 111, the random access management unit 123, and the higher layer. It should be noted that the information on security is used for data encryption (for example, key information of encryption, etc.), and is set based on one CC. Since physical information of a CC is also used for data encryption, the information on security is set on the basis of one CC. It should be noted that data encryption is applied in all the CCs allocated from the base station apparatus 3.

The UL scheduling unit 121 controls the transmission data control unit 107 based on the scheduling information of the uplink data. In addition, the UL scheduling unit 121 instructs random access to the random access management unit 123 based on the scheduling information from the higher layer.

The random access management unit 123 manages information on random access for each CC and the information on security. When performing random access to the base station apparatus 3, the random access management unit 123 determines, from the information on security, a CC in which a random access preamble is transmitted. Then, the random access management unit 123 randomly selects a sequence to be used based on downlink radio channel characteristic information passed from the reception processing unit 105 and based on a transmission data size of the message 3, by using information on random access of a CC used for random access, and notifies the random access preamble generation unit 113 of the selected CC number and sequence number (preamble number). It should be noted that details of random access will be mentioned later.

Subsequently, when confirming a content of the random access response passed from the control data analysis unit 119, and detecting the preamble number of the transmitted random access preamble, the random access management unit 123 passes transmission timing information to any of the transmission timing adjustment units 115-1 to 115-3 corresponding to the CC in which random access has been performed, and passes allocated radio resource information to the UL scheduling unit 121. Then, when confirming a contention resolution message, the random access management unit 123 completes the random access. Furthermore, the random access management unit 123 extracts a CC number, a sequence number (preamble number), and a physical random access channel number which are to be used, from random access instruction information passed from the control data analysis unit 119, and passes the CC number and the sequence number (preamble number) to the random access preamble generation unit 113.

It should be noted that a sequence selected by the mobile station apparatuses 1-1 to 1-3 is indicated as a random sequence (random preamble), and that a sequence specified from the base station apparatus 3 is indicated as a dedicated sequence (dedicated preamble). When a CC to be used is not specified from the base station apparatus 3, the mobile station apparatus 1-1 performs random access in an uplink component carrier corresponding to the downlink component carrier in which the random access instruction information has been received. Moreover, when the sequence to be used is not specified, the mobile station apparatus 1-1 selects a sequence from a random sequence.

When notification of the CC number and the sequence number is provided from the scheduling unit 109, the random access preamble generation unit 113 creates a preamble portion and a CP portion from information on random access of the specified CC, and the sequence number, to generate a random access preamble, selects a physical random access channel position to be used from the information on the random access of the specified CC, and allocates the generated random access preamble to the selected physical random access channel position. When notification of the CC number, the sequence number, and the physical random access channel number are provided from the scheduling unit 109, the random access preamble generation unit 113 creates a preamble portion and a CP portion from information on random access of the specified CC, and the sequence number, to generate a random access preamble, and selects a physical random access channel position to be used from the information on random access of the specified CC, and the random access number. Then, the random access preamble generation unit 113 allocates the generated random access preamble to a physical random access channel position selected within the instructed CC.

Figure 9:
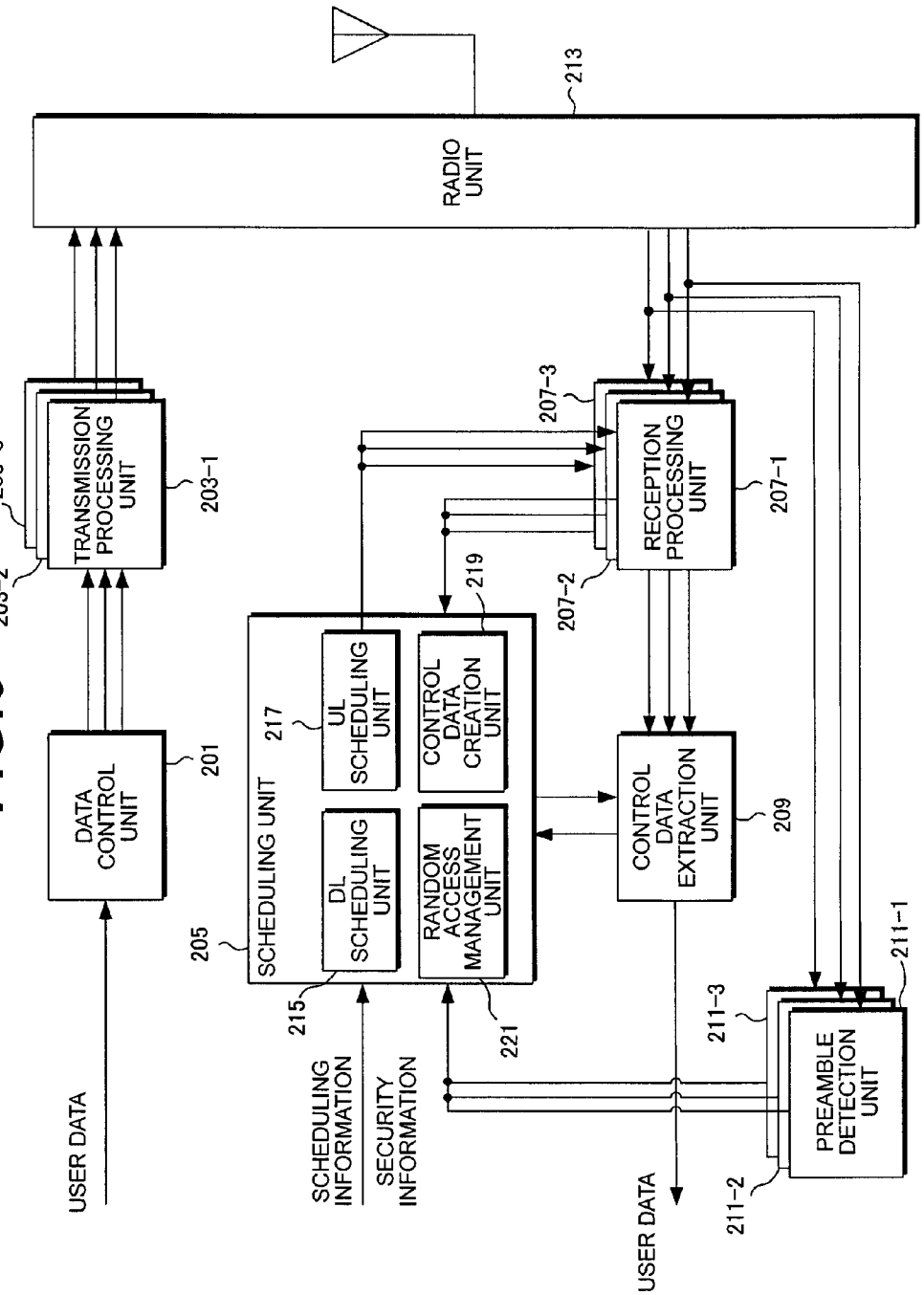
FIG. 9 is a diagram showing a configuration of a base station apparatus according to the embodiment 1 of the present invention.

FIG. 9 shows a configuration diagram of the base station apparatus 3 according to the embodiment of the present invention. The base station apparatus 3 is configured with: a data control unit 201; transmission processing units 203-1 to 203-3 (hereinafter, the transmission processing units 203-1 to 203-3 are also collectively represented as a transmission processing unit 203); a scheduling unit 205 (base station side scheduling unit); reception processing units 207-1 to 207-3 (hereinafter, the reception processing units 207-1 to 207-3 are also collectively represented as a reception processing unit 207); a control data extraction unit 209; preamble detection units 211-1 to 211-3 (hereinafter, the preamble detection units 211-1 to 211-3 are also collectively represented as a preamble detection unit 211); and a radio unit 213. The scheduling unit 205 is configured with: a DL scheduling unit 215; a UL scheduling unit 217; a control data creation unit 219, and a random access management unit 221. In addition, in the embodiment, since an example where there are three CCs is shown, a configuration having three of transmission processing units 203, reception processing units 207, and preamble detection units 211 is employed.

The data control unit 201 maps control data in a physical downlink control channel PDCCH, a downlink synchronization channel DSCH, a downlink pilot channel DPiCH, a common control physical channel CCPCH, a physical downlink shared channel PDSCH of each CC in accordance with an instruction from the scheduling unit 205, and maps transmission data to each mobile station apparatus 1-1 to 1-3 in a physical downlink shared channel PDSCH. In addition, the data control unit 201 performs encryption of the transmission data on each mobile station apparatus 1-1 to 1-3.

The transmission processing units 203-1 to 203-3 performs data modulation and series/parallel conversion of an input signal, performs OFDM signal processing, such as IFFT conversion, CP insertion, and filtering, and generates an OFDM signal. The radio unit 213 up-converts the OFDM-modulated data to a radio frequency, and transmits it to the mobile station apparatus 1-1. In addition, the radio unit 213 receives uplink data from the mobile station apparatus 1-1, down-converts it to a baseband signal, and passes the received data to the reception processing units 207-1 to 207-3 and the preamble detection units 211-1 to 211-3. The reception processing units 207-1 to 207-3 perform demodulation processing in consideration of transmission processing performed by the mobile station apparatus 1-1 from uplink scheduling information from the scheduling unit 205, and demodulate the data. In addition, the reception processing units 207-1 to 207-3 measure radio channel characteristics from an uplink pilot channel UPiCH, and passes the result to the scheduling unit 205. Meanwhile, although it is assumed that an uplink communication scheme is a single carrier scheme, such as DFT-spread OFDM, a multi carrier scheme as an OFDM scheme may be used.

The control data extraction unit 209 breaks encryption of the received data, confirms truth or error of the received data, and notifies the scheduling unit 205 of the confirmation result. When the received data is true, the control data extraction unit 209 separates the received data into user data and control data.

The scheduling unit 205 is configured with: a DL scheduling unit 215 which performs downlink scheduling; a UL scheduling unit 217 which performs uplink scheduling; a control data creation unit 219; and a random access management unit 221, and the DL scheduling unit 215 performs scheduling for mapping the user data and the control data in each downlink channel from downlink radio channel information, notification of which the mobile station apparatus 1-1 provides, data information of each user, notification of which the higher layer provides, and control data created by the control data creation unit 219. The UL scheduling unit 217 performs scheduling for mapping the user data in each uplink channel from an uplink radio channel estimation result from the reception processing unit 207 and a radio resource allocation request from the mobile station apparatus 1-1, and passes the scheduling result to the control data creation unit 219 and the reception processing unit 207. In addition, when notification of having detected the random access preamble is received from the preamble detection unit 211, the UL scheduling unit 217 allocates the physical uplink shared channel PUSCH, and notifies the control data creation unit 219 of the allocated physical uplink shared channel PUSCH and the preamble number (sequence number).

When causing the mobile station apparatus 1-1 to execute random access, the random access management unit 221 confirms whether or not a dedicated sequence (dedicated preamble) exists, selects one dedicated sequence when the dedicated sequence exists, selects a position of the random access channel RACH in which the selected dedicated sequence can be utilized, and passes, to the control data creation unit 219, a selected dedicated sequence number, the physical random access channel number, the selected dedicated sequence, information on downlink CC corresponding to the physical random access channel (CC number), and C-RNTI of the mobile station apparatus 1 (mobile station apparatus identification information). When there is no dedicated sequence (dedicated preamble), the random access management unit 221 makes the dedicated sequence number, the physical random access channel number, and the CC number into a fixed value (for example, all are made into 0 value), to pass to the control data creation unit 219. It should be noted that the physical random access channel number specified here is the information indicating a position of the physical random access channel which can be selected by the mobile station apparatus 1, and for example, it is the information on a random access channel RACH position allocated at a certain period (for example, for each one frame).

The control data creation unit 219 creates control data arranged in the physical downlink control channel PDCCH and control data arranged in the physical downlink shared channel PDSCH. The control data creation unit 219 creates control data of: a control message including scheduling information; a broadcast information message including information on random access, such as ACK/NACK of uplink data, information on a physical random access channel position, sequence information, and information on a sequence group; an initial setting message including setting information (including the information on random access) of a CC to be utilized; a security message including information on security; a random access response message including a preamble number, transmission timing information, and scheduling information; a contention resolution message; a random access instruction message including a dedicated sequence number, a physical random access channel number, and a CC number; etc. In addition, the control data creation unit 219 creates a security message from the information on security passed from the higher layer, and passes the information on security to the data control unit 201 and the control data extraction unit 209.

When detecting a random access preamble in the random access channel RACH, the preamble detection units 211-1 to 211-3 calculate an amount of transmission timing lag from the detected random access preamble, and reports to the scheduling unit 205 the CC in which the random access preamble has been detected, the detected preamble number (sequence number), and the amount of transmission timing lag.

[Operation Description]

Assume a wireless communication system which uses the random access procedure described in FIGS. 3 and 4. In addition, there is assumed a wireless communication system in which the base station apparatus 3 and the mobile station apparatus 1 described in FIGS. 6 and 7 perform communication by using a plurality of CCs.

In Advanced-EUTRA, the base station apparatus 3 allocates one or more CCs suitable for communication capability and a communication condition of the mobile station apparatus 1 among the plurality of CCs, and the mobile station apparatus 1 transmits and receives data in the allocated CC(s). When the mobile station apparatus 1 performs communication with the base station apparatus 3 by using the plurality of CCs, a transmission timing to the base station apparatus 3 may differ for each uplink CC depending on a communication condition and a connection state to the base station apparatus 3, and adjustment of the transmission timing for each uplink component carrier is required.

However, when adjustment of the transmission timing for each CC is required, random access processing is needed for each CC when an uplink at the time of initial access and handover, etc. is out of synchronization. In a case where a plurality of CCs are allocated to one mobile station apparatus 1, when random access processing is simultaneously performed for each CC, not only processing of the mobile station apparatus 1 becomes complicated, but one mobile station apparatus 1 performs a plurality of random accesses and thus, a probability of contention increases when the mobile station apparatus 1 performs the random access freely. Consequently, an unnecessary random access is avoided by execution of the random access being limited depending on the CC.

For example, when data to be transmitted is generated in the uplink, and random access for the purpose of a scheduling request is performed (when transmission of a random access preamble is determined due to generation of uplink transmission data in the mobile station apparatus 1 itself), the mobile station apparatus 1 connected to the base station apparatus 3 by utilization of a plurality of CCs performs random access processing only in a CC to which a security function has been set, and performs random access processing in the other CCs when a random access instruction from the base station apparatus 3 (random access instruction in the physical downlink control channel) is performed. It should be noted that the CC to which the security function has been set, shown here, may be an uplink CC to which the security function has been set, and may be an uplink CC having a link relation with the downlink CC to which the security function has been set.

Since the base station apparatus 3 can manage the random access in the CCs other than the CC to which the security function has been set in a manner described above, useless random access does not occur. In addition, since random access determined by the mobile station apparatus 1 itself is performed only in the CC to which the security function has been set in the mobile station apparatus 1, random access processing does not become complicated.

Operations of the mobile station apparatus 1-1 and the base station apparatus 3 will be described. The mobile station apparatus 1-1 performs cell search, and searches the base station apparatus 3 with which communication can be performed. The mobile station apparatus 1-1 finds one CC of the base station apparatus 3, and obtains broadcast information from the CC. Then, the mobile station apparatus 1-1 uses information on random access included in the broadcast information to perform random access for initial access to the base station apparatus 3. The mobile station apparatus 1-1 obtains a random access response including transmission timing information from the base station apparatus 3, sets the transmission timing, and transmits the message 3. It should be noted that the mobile station apparatus 1-1 transmits the messages 3, including, in it, a content indicating initial access. After completing a random access procedure, the mobile station apparatus 1-1 obtains, from the base station apparatus 3, various setting information such as information on security, and setting information (including information on random access) of a CC to be utilized and for each component to be utilized, and sets the obtained information. After that, exchange of user data is performed between the mobile station apparatus 1-1 and the base station apparatus 3 using the plurality of CCs.

The mobile station apparatus 1-1 becomes in a state where an uplink is out of synchronization (an uplink transmission timing is not valid) when there is no data transmission within a certain period. When transmission data newly occurs in the mobile station apparatus 1-1, the mobile station apparatus 1-1 executes random access as a scheduling request. At this time, the mobile station apparatus 1-1 selects the CC to which the security function has been set as the CC used for random access. Then, the mobile station apparatus 1-1 uses the information on random access of the CC to which the security function has been set to select one random sequence, generates a random access preamble, transmits the random access preamble to the base station apparatus 3, and performs random access.

It should be noted that when an uplink radio resource (physical uplink shared channel PUSCH) is not allocated, etc. even in a state where an uplink is synchronized (a transmission timing is valid), it is possible to similarly perform random access as a scheduling request only in the CC to which the security function has been set.

In the other CCs to which the security function has not been set, only when receiving random access instruction information through the physical downlink control channel PDCCH from the base station apparatus 3, the mobile station apparatus 1-1 performs random access in an instructed CC regardless of an uplink being synchronized or being out of synchronization. It should be noted that random access is executed through the use of a sequence specified by the random access instruction information. Also in the CC to which the security function has been set, the mobile station apparatus 1-1 performs random access when similarly receiving the random access instruction information from the base station apparatus 3.

It should be noted that when receiving the random access instruction information from the base station apparatus 3 during processing of the random access procedure as the scheduling request, the mobile station apparatus 1-1 continues the random access processing being executed, ignores the random access instruction information from the base station apparatus 3, or cancels the random access processing being executed, and performs random access in accordance with the random access instruction information from the base station apparatus 3. In addition, when receiving random access instruction information in another CC during the random access processing in accordance with the random access instruction information from the base station apparatus 3, the mobile station apparatus 1-1 gives priority to a first random access instruction, and ignores latter random access instruction information. As described above, the mobile station apparatus 1-1 does not simultaneously execute plural random access processing, and does not make the random access processing complicated.

When receiving a random access preamble, the base station apparatus 3 calculates a transmission timing of the mobile station apparatus 1-1 from the random access preamble, and provides notification of the transmission timing by a random access response. Then, after performing random access processing, the mobile station apparatus 1-1 provides notification of various setting information, such as information on security and information on a CC to be utilized, because of initial access. After that, exchange of user data is performed between the base station apparatus 3 and the mobile station apparatus 1-1.

When downlink data to the mobile station apparatus 1-1 occurs in a state where an uplink of the mobile station apparatus 1-1 is out of synchronization, or when performing transmission and reception of data by using an unused CC, the base station apparatus 3 performs a random access instruction to the mobile station apparatus 1-1. At this time, the base station apparatus 3 notifies the mobile station apparatus 1-1 of random access instruction information including a CC number to be used, a sequence number to be used, etc. through the physical downlink control channel PDCCH. Then, when receiving the random access preamble from the mobile station apparatus 1-1, the base station apparatus 3 calculates a transmission timing of the mobile station apparatus 1-1 from the received random access preamble, and provides notification of the transmission timing by a random access response.

Useless random access does not occur in a manner described above. In addition, since the mobile station apparatus 1 need not perform random access processing simultaneously, random access processing of the mobile station apparatus 1 does not become complicated.

EXAMPLE 2

Configuration Description

FIG. 10 is a diagram showing a configuration of the mobile station apparatus 1 according to the embodiment of the present invention. The mobile station apparatuses 1-1 to 1-3 are respectively configured with: the radio unit 101; the transmission processing units 103-1 to 103-3; the reception processing units 105-1 to 105-3; the transmission data control unit 107; the scheduling unit 109; the control data extraction unit 111; the random access preamble generation unit 113; and the transmission timing adjustment units 115-1 to 115-3. The scheduling unit 109 is configured with: the control data creation unit 117; the control data analysis unit 119; the UL scheduling unit 121; the random access management unit 123; and a physical uplink control channel management unit 125. In addition, in the embodiment, since an example where there are three CCs is shown, a configuration having three transmission processing units 103, reception processing units 105, and transmission timing adjustment units 115 is employed. Meanwhile, since operations of the radio unit 101, the transmission processing units 103-1 to 103-3, the reception processing units 105-1 to 105-3, the transmission data control unit 107, the control data extraction unit 111, the random access preamble generation unit 113, and the transmission timing adjustment units 115-1 to 115-3 are the same as the operations of the mobile station apparatus 1 shown in FIG. 8, descriptions thereof will be omitted.

The scheduling unit 109 is configured with: the UL scheduling unit 121; the control data analysis unit 119; the control data creation unit 117; the random access management unit 123; and the physical uplink control channel management unit 125, and the control data creation unit 117 creates control data, and creates a response of downlink data received by the control data extraction unit 111. The control data analysis unit 119 analyzes data from the control data extraction unit 111, passes scheduling information of uplink data to the UL scheduling unit 121, and passes, to the random access management unit 123 and the random access preamble generation unit 113, information on random access broadcasted from the base station apparatus 3 (arrangement information of the random access channel RACH, random access preamble generation information, etc.), information on random access, notification of which is provided at the time of initial access, random access instruction information from the base station apparatus 3, and a message content of a random access response. In addition, the control data analysis unit 119 passes physical uplink control channel allocation information from the base station apparatus 3 to the physical uplink control channel management unit 125, and passes information on security to the random access management unit 123, the transmission data control unit 107, the control data extraction unit 111, and the higher layer. It should be noted that the information on security is used for data encryption (for example, an encryption key, etc.), and is set on the basis of one CC. Since physical information of a CC is also used for data encryption, the information on security is set on the basis of one CC. It should be noted that data encryption is applied in all the CCs allocated from the base station apparatus 3.

The UL scheduling unit 121 controls the transmission data control unit 107 based on the scheduling information of the uplink data. In addition, the UL scheduling unit 121 instructs random access to the random access management unit 123 based on the scheduling information from the higher layer. The physical uplink control channel management unit 125 manages a radio resource of the physical uplink control channel PUCCH for response transmission of the downlink data allocated from the base station apparatus 3, a radio resource of the physical uplink control channel PUCCH for transmission of downlink radio channel information (CQI: Channel Quality Indicator), and a radio resource of the physical uplink control channel for transmission of a scheduling request. Then, when a valid period of an uplink transmission timing passes, the physical uplink control channel management unit 125 releases the allocated radio resource of the physical uplink control channel PUCCH. In addition, the physical uplink control channel management unit 125 notifies the random access management unit 123 of information on a CC to which the physical uplink control channel PUCCH has been set.

The random access management unit 123 manages information on random access for each CC, information on security, and setting information of the physical uplink control channel. When performing random access, the random access management unit 123 determines a CC in which a random access preamble is transmitted from the information on security, and the setting information of the physical uplink control channel PUCCH. Then, the random access management unit 123 randomly selects a sequence used for random access based on information on random access of the determined CC, downlink radio channel characteristic information passed from the reception processing unit 105, and a transmission data size of the message 3, and notifies the random access preamble generation unit 113 of the selected CC number and sequence number (preamble number). It should be noted that details of random access will be mentioned later.

Then, when confirming a content of the random access response passed from the control data analysis unit 119, and detecting the preamble number of the transmitted random access preamble, the random access management unit 123 passes transmission timing information to any of the transmission timing adjustment units 115-1 to 115-3 corresponding to the CC in which random access has been performed, and passes allocated radio resource information to the UL scheduling unit 121. Subsequently, when confirming a contention resolution message, the random access management unit 123 ends the random access. In addition, the random access management unit 123 extracts a CC number, a sequence number (preamble number), and a physical random access channel number which are used from random access instruction information passed from the control data analysis unit 119, and passes the CC number and the sequence number (preamble number) to the random access preamble generation unit 113.

FIG. 11 shows a configuration diagram of the base station apparatus 3 according to the embodiment of the present invention. The base station apparatus 3 is configured with: the data control unit 201; the transmission processing units 203-1 to 203-3; the scheduling unit 205 (a base station side scheduling unit); the reception processing units 207-1 to 207-3; the control data extraction unit 209; the preamble detection units 211-1 to 211-3; and the radio unit 213. The scheduling unit 205 is configured with: the DL scheduling unit 215; the UL scheduling unit 217; the control data creation unit 219; the random access management unit 221; and a physical uplink control channel management unit 223. In addition, in the embodiment, since an example where there are three CCs is shown, a configuration having three transmission processing units 203, reception processing units 207, and preamble detection units 211 is employed. It should be noted that since operations of the radio unit 213, the transmission processing units 203-1 to 203-3, the reception processing units 207-1 to 207-3, the data control unit 201, the control data extraction unit 209, and the preamble detection units 211-1 to 211-3 are the same as the operations of the mobile station apparatus 1 shown in FIG. 9, descriptions thereof will be omitted.

The scheduling unit 205 is configured with: the DL scheduling unit 215 which performs downlink scheduling; the UL scheduling unit 217 which performs uplink scheduling; the control data creation unit 219; and the random access management unit 221; and the physical uplink control channel management unit 223.

The DL scheduling unit 215 performs scheduling for mapping user data and control data in each downlink channel from downlink radio channel information which the mobile station apparatus 1-1 provides notification of, data information of each user which the higher layer provides notification of, and control data created by the control data creation unit 219. The scheduling unit 217 performs scheduling for mapping the user data in each uplink channel from an uplink radio channel estimation result from the reception processing unit 207 and a radio resource allocation request from the mobile station apparatus 1-1, and passes the scheduling result to the control data creation unit 219 and the reception processing unit 207. In addition, when notification of having detected the random access preamble is received from the preamble detection unit 211, the UL scheduling unit 217 allocates the physical uplink shared channel PUSCH, and notifies the control data creation unit 219 of the allocated physical uplink shared channel PUSCH and the preamble number (sequence number).

When causing the mobile station apparatus 1-1 to execute random access, the random access management unit 221 confirms whether or not a dedicated sequence (dedicated preamble) exists, selects one dedicated sequence when the dedicated sequence exists, selects a position of the random access channel RACH in which the selected dedicated sequence can be utilized, and passes, to the control data creation unit 219, a selected dedicated sequence number, the physical random access channel number, the selected dedicated sequence, information on a downlink CC corresponding to the physical random access channel (CC number), and C-RNTI of the mobile station apparatus 1 (mobile station apparatus identification information). When there is no dedicated sequence (dedicated preamble), the random access management unit 221 makes the dedicated sequence number, the physical random access channel number, and the CC number into a fixed value (for example, all are made into 0 value), to pass to the control data creation unit 219. It should be noted that the physical random access channel number specified here is the information indicating a position of the physical random access channel which can be selected by the mobile station apparatus 1, and for example, it is the information on a random access channel RACH position allocated at a certain period (for example, for each one frame).

The control data creation unit 219 creates control data arranged in the physical downlink control channel PDCCH and control data arranged in the physical downlink shared channel PDSCH. The control data creation unit 219 creates control data of: a control message including scheduling information; a broadcast information message including information on random access, such as ACK/NACK of uplink data, information on a physical random access channel position, sequence information, and information on a sequence group; an initial setting message including setting information (including the information on random access) of a CC to be utilized; a security message including information on security; a random access response message including a preamble number, transmission timing information, and scheduling information; a contention resolution message; a random access instruction message including a dedicated sequence number, a physical random access channel number, and a CC number; a control channel allocation message including allocation information of the physical uplink control channel PUCCH; etc. In addition, the control data creation unit 219 creates a security message from the information on security passed from the higher layer, and passes the information on security to the data control unit 201 and the control data extraction unit 209.

The physical uplink control channel management unit 223 manages a radio resource of the physical uplink control channel PUCCH, performs allocation of the physical uplink control channel PUCCH to the mobile station apparatus 1-1, and passes allocation information to the control data creation unit 219.

[Operation Description]

Allocation of the physical uplink control channel PUCCH to each mobile station apparatus 1 is performed on one CC as is the case in allocation of security information. Here will be shown an example where random access of a scheduling request is performed only in the CC to which the physical uplink control channel PUCCH has been allocated.

Operations of the mobile station apparatus 1-1 and the base station apparatus 3 will be described. The mobile station apparatus 1-1 performs cell search, and searches the base station apparatus 3 to which the mobile station apparatus 1-1 is connected. The mobile station apparatus 1-1 finds one CC of the base station apparatus 3, and obtains broadcast information from the CC. Then, the mobile station apparatus 1-1 makes use of information on random access included in the broadcast information to perform random access for initial access on the base station apparatus 3. Subsequently, the mobile station apparatus 1-1 obtains random access response information including transmission timing information from the base station apparatus 3, sets an uplink transmission timing, and transmits the message 3 to the base station apparatus 3. It should be noted that the mobile station apparatus 1-1 transmits the messages 3, including, in it, a content indicating initial access. After completing a random access procedure, the mobile station apparatus 1-1 obtains, from the base station apparatus 3, various setting information such as information on security, allocation information of the physical uplink control channel PUCCH, and setting information (including information on random access) of a CC to be utilized and for each CC to be utilized, and sets the obtained information. After that, exchange of user data is performed between the mobile station apparatus 1-1 and the base station apparatus 3 by using the plurality of CCs.

When uplink transmission data newly occurs in a state where allocation of the physical uplink shared channel PUSCH from the base station apparatus 3 is not performed, and an uplink is synchronized (a transmission timing is valid), the mobile station apparatus 1-1 executes random access as a scheduling request. At this time, the mobile station apparatus 1-1 selects the CC to which the physical uplink control channel PUCCH is allocated as a CC used for random access. Then, the mobile station apparatus 1-1 uses the information on random access of the CC to which the physical uplink control channel PUCCH has been allocated to select one random sequence, generates a random access preamble, transmits the random access preamble to the base station apparatus 3, and executes a random access procedure.

In addition, the mobile station apparatus 1-1 becomes in a state where an uplink is out of synchronization (the uplink transmission timing is not valid) when there is no data transmission within a certain period, and releases the radio resource of the physical uplink control channel PUCCH allocated from the base station apparatus 3. When transmission data newly occurs in the mobile station apparatus 1-1, the mobile station apparatus 1-1 executes random access as a scheduling request. At this time, the mobile station apparatus 1-1 selects the CC to which the security function has been set, as the CC used for random access. Subsequently, the mobile station apparatus 1-1 through the use of the information on random access of the CC to which a security function has been set, selects one random sequence, generates a random access preamble, transmits the random access preamble to the base station apparatus 3, and executes a random access procedure.

In a CC to which the physical uplink control channel PUCCH has not been allocated, and the other CCs to which the security function has not been set, the mobile station apparatus 1-1 performs random access in an instructed CC regardless of an uplink being synchronized or being out of synchronization, only when receiving random access instruction information through the physical downlink control channel PDCCH from the base station apparatus 3. It should be noted that random access is executed through the use of a sequence specified by the random access instruction information. Also in the CC to which the physical uplink control channel PUCCH has been allocated, the mobile station apparatus 1-1 performs random access when similarly receiving the random access instruction information from the base station apparatus 3.

Meanwhile, when receiving the random access instruction information from the base station apparatus 3 during processing of the random access procedure as the scheduling request, the mobile station apparatus 1-1 continues random access processing as the scheduling request, ignores the random access instruction information from the base station apparatus 3, or cancels the random access processing as the scheduling request, and performs random access in accordance with the random access instruction information from the base station apparatus 3. In addition, when receiving random access instruction information in another CC during the random access processing in accordance with the random access instruction information from the base station apparatus 3, the mobile station apparatus 1-1 gives priority to a first random access instruction, and ignores latter random access instruction information. As described above, the mobile station apparatus 1-1 does not execute a plurality of random access processing simultaneously.

When receiving a random access preamble, the base station apparatus 3 calculates a transmission timing of the mobile station apparatus 1-1 from the random access preamble, and provides notification of the transmission timing by a random access response. Then, after performing random access processing, the mobile station apparatus 1-1 provides notification of various setting information such as allocation information of the physical uplink control channel through which CQI is transmitted, information on security, and information on a CC to be utilized, because of initial access. After that, exchange of user data is performed between the base station apparatus 3 and the mobile station apparatus 1-1.

When downlink data to the mobile station apparatus 1-1 occurs in a state where an uplink of the mobile station apparatus 1-1 is out of synchronization, and when performing transmission and reception of data by using an unused CC, the base station apparatus 3 performs a random access instruction on the mobile station apparatus 1-1. At this time, the base station apparatus 3 notifies the mobile station apparatus 1-1 of random access instruction information including a CC number to be used, a sequence number to be used, etc. through the physical downlink control channel PDCCH. Subsequently, when receiving the random access preamble from the mobile station apparatus 1-1, the base station apparatus 3 calculates a transmission timing of the mobile station apparatus 1-1 from the received random access preamble, and provides notification of the transmission timing by a random access response.

Useless random access does not occur in a manner described above. In addition, since the mobile station apparatus 1 need not perform random access processing simultaneously, random access processing of the mobile station apparatus 1 does not become complicated.

EXAMPLE 3

Configuration Description

A configuration of the mobile station apparatus 1 according to the embodiment of the present invention is the same as that of FIG. 8. The mobile station apparatuses 1-1 to 1-3 are configured with: the radio unit 101; the transmission processing units 103-1 to 103-3; the reception processing units 105-1 to 105-3; the transmission data control unit 107; the scheduling unit 109; the control data extraction unit 111; the random access preamble generation unit 113; and the transmission timing adjustment units 115-1 to 115-3. The scheduling unit 109 is configured with: the control data creation unit 117; the control data analysis unit 119; the UL scheduling unit 121; and the random access management unit 123. In addition, in the embodiment, since an example where there are three CCs is shown, a configuration having three of transmission processing units 103, reception processing units 105, and transmission timing adjustment units 115 is employed. It Meanwhile, since operations of the radio unit 101, the transmission processing units 103-1 to 103-3, the reception processing units 105-1 to 105-3, the transmission data control unit 107, the control data extraction unit 111, the random access preamble generation unit 113, and the transmission timing adjustment units 115-1 to 115-3 are the same as the operations of the mobile station apparatus 1 shown in FIG. 8, descriptions thereof will be omitted.

The scheduling unit 109 is configured with: the UL scheduling unit 121; the control data analysis unit 119; the control data creation unit 117; and the random access management unit 123. The control data creation unit 117 creates control data, and creates a response of downlink data received by the control data extraction unit 111. The control data analysis unit 119 analyzes data from the control data extraction unit 111, passes scheduling information of uplink data to the UL scheduling unit 121, and passes, to the random access management unit 123 and the random access preamble generation unit 113, information on random access from the base station apparatus 3 (arrangement information of the random access channel RACH, random access preamble generation information, etc.), random access instruction information from the base station apparatus 3, and a message content of a random access response.

The UL scheduling unit 121 controls the transmission data control unit 107 based on the scheduling information of the uplink data. In addition, the UL scheduling unit 121 instructs random access to the random access management unit 123 based on the scheduling information from the higher layer.

The random access management unit 123 manages the obtained information on random access of the CC. When performing random access, the random access management unit 123 determines a CC in which a random access preamble is transmitted among the CCs holding the information on random access. Subsequently, the random access management unit 123 randomly selects a sequence to be used based on information on random access of the determined CC, downlink radio channel characteristic information passed from the reception processing unit 105, and a transmission data size of the message 3, and notifies the random access preamble generation unit 113 of the selected CC number and sequence number (preamble number). It should be noted that details of random access will be mentioned later.

Subsequently, when confirming a content of the random access response passed from the control data analysis unit 119, and detecting the preamble number of the transmitted random access preamble, the random access management unit 123 passes transmission timing information to any of the transmission timing adjustment units 115-1 to 115-3 corresponding to the CC in which random access has been performed, and passes allocated radio resource information to the UL scheduling unit 121. Then, when confirming a contention resolution message, the random access management unit 123 completes the random access. In addition, the random access management unit 123 extracts a CC number, a sequence number (preamble number), and a physical random access channel number which are used from the random access instruction information passed from the control data analysis unit 119, and passes the CC number and the sequence number (preamble number) to the random access preamble generation unit 113.

It should be noted that a sequence selected by the mobile station apparatuses 1-1 to 1-3 is indicated as a random sequence (random preamble), and that a sequence specified from the base station apparatus 3 is indicated as a dedicated sequence (dedicated preamble). When a CC to be used is not specified from the base station apparatus 3, the mobile station apparatus 1-1 performs random access in an uplink CC corresponding to the downlink CC in which the random access instruction information has been received. In addition, when the sequence to be used is not specified, the mobile station apparatus 1-1 selects a sequence from a random sequence.

A configuration diagram of the base station apparatus 3 according to the embodiment of the present invention is the same as that of FIG. 9. The base station apparatus 3 is configured with: the data control unit 201; the transmission processing units 203-1 to 203-3; the scheduling unit 205 (base station side scheduling unit); the reception processing units 207-1 to 207-3; the control data extraction unit 209; the preamble detection units 211-1 to 211-3; and the radio unit 213. The scheduling unit 205 is configured with: the DL scheduling unit 215; the UL scheduling unit 217; the control data creation unit 219, and the random access management unit 221. In addition, in the embodiment, since an example where there are three CCs is shown, a configuration having three transmission processing units 203, reception processing units 207, and preamble detection units 211 is employed. It should be noted that operations of the radio unit 213, the transmission processing units 203-1 to 203-3, the reception processing units 207-1 to 207-3, the data control unit 201, the control data extraction unit 209, and the preamble detection units 211-1 to 211-3 are the same as the operations of the mobile station apparatus 1 shown in FIG. 9, descriptions thereof will be omitted.

The scheduling unit 205 is configured with: the DL scheduling unit 215 which performs downlink scheduling; the UL scheduling unit 217 which performs uplink scheduling; the control data creation unit 219; and the random access management unit 221. The DL scheduling unit 215 performs scheduling for mapping user data and control data in each downlink channel from downlink radio channel information, notification of which the mobile station apparatus 1-1 provides, data information of each user, notification of which the higher layer provides, and control data created by the control data creation unit 219, and the UL scheduling unit 217 performs scheduling for mapping the user data in each uplink channel from an uplink radio channel estimation result from the reception processing unit 207 and a radio resource allocation request from the mobile station apparatus 1-1, and passes the scheduling result to the control data creation unit 219 and the reception processing unit 207. In addition, when notification of having detected the random access preamble is received from the preamble detection unit 211, the UL scheduling unit 217 allocates the physical uplink shared channel PUSCH, and notifies the control data creation unit 219 of the allocated physical uplink shared channel PUSCH and the preamble number (sequence number).

The random access management unit 221 determines a CC in which random access is allowed at the time of allocation of CCs. Then, the random access management unit 221 passes information on random access of the allowed CC to the control data creation unit 219. In addition, when causing the mobile station apparatus 1-1 to execute random access, the random access management unit 221 confirms whether or not a dedicated sequence (dedicated preamble) exists, selects one dedicated sequence when the dedicated sequence exists, selects a position of the random access channel RACH in which the selected dedicated sequence can be utilized, and passes, to the control data creation unit 219, a selected dedicated sequence number, the physical random access channel number, the selected dedicated sequence, information on a downlink CC corresponding to the physical random access channel (CC number), and C-RNTI of the mobile station apparatus 1 (mobile station apparatus identification information). When there is no dedicated sequence (dedicated preamble), the random access management unit 221 makes the dedicated sequence number, the physical random access channel number, and the CC number into a fixed value (for example, all are made into 0 value), to pass to the control data creation unit 219. It should be noted that the physical random access channel number specified here is the information indicating a position of the physical random access channel which can be selected by the mobile station apparatus 1, and for example, it is the information on a random access channel RACH position allocated at a certain period (for example, for each one frame).

The control data creation unit 219 creates control data arranged in the physical downlink control channel PDCCH and control data arranged in the physical downlink shared channel PDSCH. The control data creation unit 219 creates control data of: a control message including scheduling information; a broadcast information message including information on random access, such as ACK/NACK of uplink data, information on a physical random access channel position, sequence information, and information on a sequence group; an initial setting message including setting information (including the information on random access) of a CC to be utilized; a security message including information on security; a random access response message including a preamble number, transmission timing information, and scheduling information; a contention resolution message; a random access instruction message including a dedicated sequence number, a physical random access channel number, and a CC number; etc.

[Operation Description]

When allocating a plurality of CCs to the mobile station apparatus 1, and communicating with the mobile station apparatus 1, the base station apparatus 3 notifies the mobile station apparatus 1 of each CC setting information (information determined for each CCs, such as information on a channel configuration of each physical channel and random access which are set for each CC) as well as allocation information of the CCs. Although the mobile station apparatus 1 can obtain setting information of each CC from broadcast information, the base station apparatus 3 individually notifies the mobile station apparatus 1 of the setting information of the CC at the time of CC allocation so as to be able to immediately start communication by using the plurality of CCs when the plurality of CCs are set. As a result, the base station apparatus 3 can forbid random access by not including, in CC setting information, information on random access of a CC in which random access is not needed, among setting information of the CCs at the time of notification of allocation information of the CCs and setting information of each CC.

Operations of the mobile station apparatus 1-1 and the base station apparatus 3 will be described. The mobile station apparatus 1-1 performs cell search, finds one CC of the base station apparatus 3, and obtains broadcast information from the CC. Then, the mobile station apparatus 1-1 uses information on random access included in the broadcast information to perform random access for initial access to the base station apparatus 3. Subsequently, the mobile station apparatus 1-1 obtains random access response information including transmission timing information from the base station apparatus 3, sets an uplink transmission timing, and transmits the message 3 to the base station apparatus 3. It should be noted that the mobile station apparatus 1-1 transmits the messages 3, including, in it, a content indicating initial access. After completing a random access procedure, the mobile station apparatus 1-1 is notified of a CC to be utilized and a CC in which random access has been allowed by the base station apparatus 3. Subsequently, the mobile station apparatus 1-1 obtains various setting information such as CC setting information excluding information on random access of the CC to be utilized, and CC setting information including information on random access of the CC in which random access has been allowed, and sets the obtained information. After that, exchange of user data is performed between the mobile station apparatus 1-1 and the base station apparatus 3 by using the plurality of CCs.

When uplink transmission data newly occurs in a state where allocation of the physical uplink shared channel PUSCH from the base station apparatus 3 is not performed, and an uplink is synchronized (a transmission timing is valid), or in a state where the uplink is out of synchronization (the transmission timing is not valid), the mobile station apparatus 1-1 executes random access as a scheduling request. At this time, the mobile station apparatus 1-1 selects a CC in which random access has been allowed as the CC used for random access. Subsequently, the mobile station apparatus 1-1 uses the information on random access of the CC in which random access has been allowed to select one random sequence, generates a random access preamble, transmits the random access preamble to the base station apparatus 3, and executes a random access procedure. It should be noted that when there are a plurality of CCs in which random access has been allowed, the mobile station apparatus 1-1 randomly selects a CC to be used. In addition, the mobile station apparatus 1-1 may select the CC to be used in consideration of a communication state of the CC, etc.

When receiving a random access instruction through the physical downlink control channel PDCCH from the base station apparatus 3, the mobile station apparatus 1-1 performs random access in accordance with a content of the random access instruction if the CC indicated by the random access instruction is the CC in which random access has been allowed. It should be noted that if the CC indicated by the random access instruction is the CC in which random access has not been allowed, the mobile station apparatus 1-1 does not perform random access even though there is a random access instruction.

It should be noted that when receiving the random access instruction information from the base station apparatus 3 during processing of the random access procedure as the scheduling request, the mobile station apparatus 1-1 continues random access processing as the scheduling request, ignores the random access instruction information from the base station apparatus 3, or cancels the random access processing as the scheduling request, and performs random access in accordance with the random access instruction information from the base station apparatus 3. In addition, when receiving random access instruction information in another CC during the random access processing in accordance with the random access instruction information from the base station apparatus 3, the mobile station apparatus 1-1 gives priority to a first random access instruction, and ignores latter random access instruction information. As described above, the mobile station apparatus 1-1 does not execute a plurality of random access processing simultaneously.

When receiving a random access preamble, the base station apparatus 3 calculates a transmission timing of the mobile station apparatus 1-1 from the random access preamble, and provides notification of the transmission timing by a random access response. Then, after performing random access processing, the mobile station apparatus 1-1 provides notification of the CCs to be utilized and the CC in which random access is allowed among the CCs to be utilized, because of initial access and further, provides notification of various setting information such as CC setting information excluding information on random access of the CC to be utilized, and CC setting information including information on random access of the CC in which random access is allowed. After that, exchange of user data is performed between the base station apparatus 3 and the mobile station apparatus 1-1.

When downlink data to the mobile station apparatus 1-1 occurs in a state where an uplink of the mobile station apparatus 1-1 is out of synchronization, and when performing transmission and reception of data by using an unused CC, the base station apparatus 3 performs a random access instruction to the mobile station apparatus 1-1. At this time, the base station apparatus 3 notifies the mobile station apparatus 1-1 of random access instruction information including a CC number to be used, a sequence number to be used, etc. through the physical downlink control channel PDCCH. Subsequently, when receiving the random access preamble from the mobile station apparatus 1-1, the base station apparatus 3 calculates a transmission timing of the mobile station apparatus 1-1 from the received random access preamble, and provides notification of the transmission timing by the random access response.

Useless random access does not occur in a manner described above. In addition, since the mobile station apparatus 1 is not required to perform random access processing simultaneously, random access processing of the mobile station apparatus 1 does not become complicated. Meanwhile, although the CC in which random access is forbidden is defined by not providing notification of information on random access in the embodiment, the mobile station apparatus 1-1 may provide notification of information on random access of all the CCs, and may provide notification of another piece of information indicating allowance/no allowance of random access for each CC. In a manner described above, the base station apparatus 3 can set freely allowing or not allowing of random access to the mobile station apparatus 1.

(a) As described above, the following configurations can be employed in the embodiment. That is, a wireless communication system of the present invention is the wireless communication system in which a base station apparatus allocates a plurality of CCs to a mobile station apparatus, and the mobile station apparatus performs random access during communication, wherein the base station apparatus notifies the mobile station apparatus of security information, and the mobile station apparatus transmits a random access preamble in a CC to which a security function indicated from the security information has been set, when needing random access of a scheduling request, and transmits a random access preamble in CCs other than the CC to which the security function has been allocated, only when receiving a random access instruction through a physical downlink control channel.

As described above, the base station apparatus notifies the mobile station apparatus of security information, the mobile station apparatus performs random access of the scheduling request only in the component carrier to which the security function indicated from the security information has been set, and performs random access in accordance with the random access instruction in the other CCs, whereby the mobile station apparatus cannot perform random access without an instruction from the base station apparatus in the CCs other than the CC to which the security function has not been set, thereby making it possible to perform efficient random access without occurrence of useless random access.

(b) In addition, a wireless communication system of the present invention is the wireless communication system in which a base station apparatus allocates a plurality of CCs to a mobile station apparatus, and the mobile station apparatus performs random access during communication, wherein the base station apparatus notifies the mobile station apparatus of allocation information of CCs, setting information of a CC including information on random access, and setting information of a CC not including the information on random access, and that the mobile station apparatus receives the allocation information and the setting information, and transmits a random access preamble only in the CC having setting information on random access among the plurality of CCs allocated from the base station apparatus.

As described above, the base station apparatus notifies the mobile station apparatus of setting information of the CC including information on random access and setting information of the CC not including the information on random access, and the mobile station apparatus performs random access only in the CC notified of the information on random access by the base station apparatus, thereby making it possible to perform efficient random access without occurrence of useless random access.

(c) In addition, a mobile station apparatus of the present invention is the mobile station apparatus to which a plurality of CCs are allocated by abase station apparatus, and which performs random access even during communication with the base station apparatus, wherein when receiving security information from the base station apparatus, and needing a random access of a scheduling request, the mobile station apparatus transmits a random access preamble in a CC to which a security function indicated from the security information has been set, and transmits a random access preamble in CCs other than the CC to which the security function has been allocated only when receiving a random access instruction through a physical downlink control channel.

As described above, the base station apparatus notifies the mobile station apparatus of security information, the mobile station apparatus performs random access of the scheduling request only in the component to which the security function indicated from the security information has been set, and performs random access in accordance with the random access instruction in the other CCs, whereby the mobile station apparatus cannot perform random access without an instruction from the base station apparatus in the CCs other than the CC to which the security function has not been set, thereby making it possible to perform efficient random access without occurrence of useless random access.

(d) In addition, a mobile station apparatus of the present invention is the mobile station apparatus to which a plurality of CCs are allocated by abase station apparatus, and which performs random access even during communication with the base station apparatus, wherein when receiving allocation information of a physical uplink control channel from the base station apparatus, and needing random access of a scheduling request, the mobile station apparatus transmits a random access preamble in a CC to which the physical uplink control channel has been allocated, and transmits the random access preamble in the CCs other than the CC to which the physical uplink control channel has been allocated, only when receiving a random access instruction through a physical downlink control channel.

As described above, the base station apparatus notifies the mobile station apparatus of physical uplink control channel allocation, and the mobile station apparatus performs random access of the scheduling request only in the component carrier in which the physical uplink control channel has been set, and performs random access in accordance with the random access instruction in the other CCs, whereby the mobile station apparatus cannot perform random access without an instruction from the base station apparatus in CCs other than the CC to which the physical uplink control channel has not been set, thereby making it possible to perform efficient random access without occurrence of useless random access.

(e) A mobile station apparatus of the present invention is the mobile station apparatus to which a plurality of CCs are allocated by a base station apparatus, and which performs random access even during communication with the base station apparatus, wherein the mobile station apparatus receives, from the base station apparatus, allocation information of CCs, setting information of a CC including setting information on random access, and setting information of a CC not including the information on random access, and transmits a random access preamble, only in the CC having the setting information on random access among the plurality of CCs allocated from the base station apparatus.

As described above, the base station apparatus notifies the mobile station apparatus of setting information of the CC including information on random access and setting information of the CC not including the information on random access, and the mobile station apparatus performs random access only in the CC notified of the information on random access by the base station apparatus, thereby making it possible to perform efficient random access without occurrence of useless random access.

(f) In addition, a mobile station apparatus of the present invention is the mobile station apparatus to which a plurality of CCs are allocated by a base station apparatus, and which performs random access even during communication with the base station apparatus, wherein when receiving random access instruction information for other CCs through a physical downlink control channel during execution of random access processing in one CC, the mobile station apparatus performs either one of processing to ignore the random access instruction information, or to cancel the random access processing being executed to transmit a random access preamble in a CC indicated by the random access instruction information.

As described above, when receiving the random access instruction information for the other CCs through the physical downlink control channel during execution of random access processing in one CC, the mobile station apparatus performs either one of processing to ignore the random access instruction information, or to cancel the random access processing being executed to transmit the random access preamble in the CC indicated by the random access instruction information, and thus a load of the mobile station apparatus can be reduced since plural random access processing is not performed simultaneously.

(g) A base station apparatus of the present invention is the base station apparatus which allocates a plurality of CCs to a mobile station apparatus, and receives a random access preamble from the mobile station apparatus during communication with the mobile station apparatus, wherein the base station apparatus notifies the mobile station apparatus of allocation information of CCs, setting information of a CC including information on random access, and setting information of a CC not including the information on random access.

As described above, the base station apparatus notifies the mobile station apparatus of setting information of the CC including information on random access and setting information of the CC not including the information on random access, and thus the mobile station apparatus performs random access only in the CC notified of the information on random access by the base station apparatus, thereby making it possible to perform efficient random access without occurrence of useless random access.

(h) In addition, a random access method of the present invention is a wireless communication method applied to a wireless communication system in which a base station apparatus allocates a plurality of CCs to a mobile station apparatus, and the mobile station apparatus performs random access during communication, wherein the random access method includes at least the steps of: in the base station apparatus, notifying the mobile station apparatus of security information; in the mobile station apparatus, transmitting a random access preamble in a CC to which a security function indicated from the security information has been set when random access of a scheduling request is needed; and transmitting a random access preamble in CCs other than the CC to which the security function has been allocated, only when the mobile station apparatus receives a random access instruction through a physical downlink control channel.

As described above, the base station apparatus notifies the mobile station apparatus of security information, and the mobile station apparatus performs random access of the scheduling request only in the CC to which the security function indicated from the security information has been set, and performs random access in accordance with the random access instruction in the other CCs, whereby the mobile station apparatus cannot perform random access without an instruction from the base station apparatus in the CCs other than the CC to which the security function has not been set, thereby making it possible to perform efficient random access without occurrence of useless random access.

(i) A random access method of the present invention is a wireless communication method applied to a wireless communication system in which a base station apparatus allocates a plurality of CCs to a mobile station apparatus, and the mobile station apparatus performs random access during communication, wherein the random access method includes at least the steps of: in the base station apparatus, notifying the mobile station apparatus of allocation information of CCs, setting information of a CC including information on random access, and setting information of a CC not including the information on random access; in the mobile station apparatus, receiving the allocation information and the setting information; and transmitting a random access preamble only in the CC having the setting information on random access among the plurality of CCs allocated from the base station apparatus.

As described above, the base station apparatus notifies the mobile station apparatus of setting information of the CC including information on random access and setting information of the CC not including the information on random access, and the mobile station apparatus performs random access only in the CC notified of the information on random access by the base station apparatus, thereby making it possible to perform efficient random access without occurrence of useless random access.

(j) In addition, an integrated circuit of the present invention is the integrated circuit applied to a wireless communication system in which a base station apparatus allocates a plurality of CCs to a mobile station apparatus, and the mobile station apparatus performs random access during communication, wherein the integrated circuit includes means for: obtaining security information from the base station apparatus; transmitting a random access preamble in a CC to which a security function has been set from the security information, when random access of a scheduling request is needed; and transmitting a random access preamble in CCs other than the CC to which the security function has been allocated, only when the mobile station apparatus receives a random access instruction through a physical downlink control channel.

As described above, the base station apparatus notifies the mobile station apparatus of security information, and the mobile station apparatus performs random access of the scheduling request only in the component to which the security function indicated from the security information has been set, and performs random access in accordance with the random access instruction in the other CCs, whereby the mobile station apparatus cannot perform random access without an instruction from the base station apparatus in the CCs other than the CC to which the security function has not been set, thereby making it possible to perform efficient random access without occurrence of useless random access.

(k) In addition, an integrated circuit of the present invention is the integrated circuit applied to a wireless communication system in which a base station apparatus allocates a plurality of CCs to a mobile station apparatus, and the mobile station apparatus performs random access during communication, wherein the integrated circuit includes means for: receiving, from the base station apparatus, allocation information of CCs, setting information of a CC including setting information on random access, and setting information of a CC not including the information on random access; transmitting a random access preamble only in the CC having the setting information on random access among the plurality of CCs allocated from the base station apparatus.

As described above, the base station apparatus notifies the mobile station apparatus of setting information of the CC including information on random access and setting information of the CC not including the information on random access, and the mobile station apparatus performs random access only in the CC notified of the information on random access by the base station apparatus, thereby making it possible to perform efficient random access without occurrence of useless random access.

(1) In addition, an integrated circuit of the present invention is the integrated circuit applied to a wireless communication system in which a base station apparatus allocates a plurality of CCs to a mobile station apparatus, and the mobile station apparatus performs random access during communication, wherein the integrated circuit includes means for notifying the mobile station apparatus of allocation information of CCs, setting information of a CC including information on random access, and setting information of a CC not including the information on random access.

As described above, the base station apparatus notifies the mobile station apparatus of setting information of the CC including information on random access and setting information of the CC not including the information on random access, and the mobile station apparatus performs random access only in the CC notified of the information on random access by the base station apparatus, thereby making it possible to perform efficient random access without occurrence of useless random access.

As described above, although one embodiment of the present invention has been described in detail with reference to the drawings, a specific configuration is not limited to the above, and various modifications of design etc. can be performed without departing from the gist of the present invention.

In addition, although the mobile station apparatus 1-1 and the base station apparatus 3 of the embodiment have been described by using the functional block diagrams for convenience of description, control of the mobile station apparatus 1 and the base station apparatus 3 may be performed by recording in a computer-readable recording medium a program for achieving functions of each unit of the mobile station apparatus 1-1 and the base station apparatus 3 or apart of these functions, causing the program recorded in the recording medium to read into a computer system, and executing the program. It should be noted that a "computer system" referred to herein is assumed to include hardwares such as an OS and a peripheral device.

In addition, a "computer-readable recording medium" means a portable medium such as a flexible disk, a magnetic optical disk, a ROM, and a CD-ROM, and a memory storage incorporated in the computer system such as a hard disk. Furthermore, the "computer-readable recording medium" is assumed to also include a medium that dynamically holds a program for a short time, and a medium that holds a program for a certain time as a volatile memory inside the computer system serving as a server or a client when the program is dynamically held for the short time as a communication wire used when the program is transmitted through a communication line, such as a network like the Internet, and a telephone line. In addition, the above-described program may be the program for achieving a part of the above-mentioned functions and furthermore, it may be the program in which the above-mentioned functions can be achieved in combination with a program having been already recorded in the computer system.

In addition, each functional block used for each of the above-described embodiment may be typically achieved as an LSI, which is an integrated circuit. Each functional block may be formed into a chip individually, or some or all of the functional blocks may be integrated to be formed into a chip. In addition, a technique for making the functional blocks into an integrated circuit may be achieved not only in the LSI but in a dedicated circuit or a general-purpose processor. Furthermore, when a technology for making the functional blocks into the integrated circuit as an alternative to the LSI appears due to progress of a semiconductor technology, it is also possible to use an integrated circuit made by the technology.

As described above, although the embodiments of the present invention have been mentioned in detail with reference to the drawings, a specific configuration is not limited to the embodiments, and a design etc. in the scope not departing from the gist of the present invention are also included in the claims.

DESCRIPTION OF SYMBOLS 1 and 1-1 to 1-3 MOBILE STATION APPARATUS
3 BASE STATION APPARATUS
101 and 213 RADIO UNIT
103, 103-1 to 103-3, 203, and 203-1 to 203-3 TRANSMISSION PROCESSING UNIT
105, 105-1 to 105-3, 207, and 207-1 to 207-3 RECEPTION PROCESSING UNIT
109 and 205 SCHEDULING UNIT

The invention claimed is:
1. A terminal apparatus comprising:
a radio unit configured to:
   receive first component carrier setting information and second component carrier setting information, wherein:
      the first component carrier setting information includes information related to random access and includes information related to configuration of physical channel of a first component carrier,
      the second component carrier setting information does not include the information related to random access and includes information related to configuration of physical channel of one or more second component carriers,
      the information related to random access includes position information of random access channel, sequence information and information related to sequence group, and
      resources on each of a plurality of component carriers which include the first component carrier and the one or more second component carriers are allocated by the base station apparatus;
   in a case of receiving random access instruction information, set a random access preamble based on a preamble number included in the random access instruction information;
   otherwise set a random access preamble based on the information related to random access included in the first component carrier setting information;
   transmit the random access preamble on the first component carrier; and
   communicate with the base station apparatus by using one or more component carriers.
2. The terminal apparatus according to claim 1, wherein the second component carrier setting information includes another information related to random access.
3. A base station apparatus comprising:
a radio unit configured to:
   allocate resources on each of a plurality of component carriers, wherein the plurality of component carriers include a first component carrier and one or more second component carriers;
   transmit first component carrier setting information and second component carrier setting information, wherein:
      the first component carrier setting information includes information related to random access and includes information related to configuration of physical channel of the first component carrier,
      the second component carrier setting information does not include the information related to random access and includes information related to configuration of physical channel of the one or more second component carriers, and
      the information related to random access includes position information of random access channel, sequence information and information related to sequence group; and
   in a case that the terminal apparatus is made to perform random access, transmit random access instruction information which includes a preamble number and a random access channel number.

4. The base station apparatus according to claim 3, wherein
the second component carrier setting information includes another information related to random access.

5. A random access method applied to a terminal apparatus, the random access method comprising:
receiving first component carrier setting information and second component carrier setting information, wherein:
the first component carrier setting information includes information related to random access and includes information related to configuration of physical channel of a first component carrier,
the second component carrier setting information does not include the information related to random access and includes information related to configuration of physical channel of one or more second component carriers,
the information related to random access includes position information of random access channel, sequence information and information related to sequence group, and
resources on each of a plurality of component carriers which include the first component carrier and the one or more second component carriers are allocated by the base station apparatus;
in a case of receiving random access instruction information, set a random access preamble based on a preamble number included in the random access instruction information;
otherwise set a random access preamble based on the information related to random access included in the first component carrier setting information;
transmitting the random access preamble on the first component carrier; and
communicating with the base station apparatus by using one or more component carriers.

6. The random access method according to claim 5, wherein
the second component carrier setting information includes another information related to random access.

7. A random access method applied to a base station apparatus, the random access method comprising:
allocating resources on each of a plurality of component carriers, wherein the plurality of component carriers include a first component carrier and one or more second component carriers;
transmitting first component carrier setting information and second component carrier setting information, wherein:
the first component carrier setting information includes information related to random access and includes information related to configuration of physical channel of the first component carrier,
the second component carrier setting information does not include the information related to random access and includes information related to configuration of physical channel of the one or more second component carriers, and
the information related to random access includes position information of random access channel, sequence information and information related to sequence group; and
in a case that the terminal apparatus is made perform random access, transmit random access instruction information which includes a preamble number and a random access channel number.

8. The random access method according to claim 7, wherein
the second component carrier setting information includes another information related to random access.

9. A processing device that is mounted in the terminal apparatus, wherein the processing device performs the random access method according to claim 5.

10. A processing device that is mounted in the terminal apparatus, wherein the processing device performs the random access method according to claim 6.

11. A processing device that is mounted in the base station apparatus, wherein the processing device performs the random access method according to claim 7.

12. A processing device that is mounted in the base station apparatus, wherein the processing device performs the random access method according to claim 8.

* * * * *